United States Patent
Sinisi

(10) Patent No.: US 7,313,759 B2
(45) Date of Patent: Dec. 25, 2007

(54) SYSTEM AND METHOD FOR MOBILE DATA COLLECTION

(76) Inventor: John P. Sinisi, 250 E. Main St., Manasquan, NJ (US) 08736

( * ) Notice: Subject to any disclaimer, the term of this patent is extended or adjusted under 35 U.S.C. 154(b) by 287 days.

(21) Appl. No.: 10/690,114

(22) Filed: Oct. 21, 2003

(65) Prior Publication Data

US 2004/0128613 A1    Jul. 1, 2004

Related U.S. Application Data

(60) Provisional application No. 60/419,762, filed on Oct. 21, 2002.

(51) Int. Cl.
*G06F 15/00* (2006.01)

(52) U.S. Cl. ...................... 715/530; 715/500

(58) Field of Classification Search ................ 715/530, 715/531, 500
See application file for complete search history.

(56) References Cited

U.S. PATENT DOCUMENTS

| | | | |
|---|---|---|---|
| 5,298,725 A | 3/1994 | Fischer | 235/382 |
| 5,774,449 A * | 6/1998 | Czachowski et al. | 702/182 |
| 5,848,420 A | 12/1998 | Xu | 707/104 |
| 5,856,931 A | 1/1999 | McCasland | 702/182 |
| 6,078,255 A | 6/2000 | Dividock et al. | 340/539 |
| 6,192,381 B1 * | 2/2001 | Stiegemeier et al. | 715/505 |
| 6,518,881 B2 | 2/2003 | Monroe | 340/539 |
| 6,539,400 B1 | 3/2003 | Bloomfield et al. | 707/104.1 |
| 6,594,621 B1 | 7/2003 | Meeker | 702/185 |
| 6,986,145 B2 * | 1/2006 | Gangopadhyay | 719/316 |
| 2001/0042078 A1 * | 11/2001 | Anwar | 707/500 |
| 2001/0052861 A1 * | 12/2001 | Ohmura et al. | 340/988 |
| 2002/0027164 A1 * | 3/2002 | Mault et al. | 235/462.46 |

(Continued)

OTHER PUBLICATIONS

Lieberman, Out of Many, One: Reliable Results from Unreliable Recognition, ACM 2002, pp. 728-729.*

(Continued)

*Primary Examiner*—Cong-Lac Huynh
(74) *Attorney, Agent, or Firm*—Mathews, Shepherd, McKay & Bruneau, P.A.

(57) ABSTRACT

The present invention relates to a system and method for mobile data collection in which a handheld device collects and integrates one or more forms of data. For example, data can include text, digital photographs, digital video, barcodes, sketches, digital signatures, audio, GPS, GIS, document scan, print scan, CAD/CAM scan, and interactive data retrieval from other systems data. Firmware on the handheld device provides a data collection template as a visual display on the handheld device to provide a user interface for collecting the forms of data. The data collection template can comprise consecutive questions nested in menus or submenus, data collection prompts and commands for guiding a user through data collection activities. A permanent record is generated from the collected data. The permanent record is synchronized to manipulate data in the record for later use such as optimization of the data collection template, production of reports from the collected data and storage of the collected data. The data collection template can be optimized during use of the handheld device to organize selections on the data collection template based on certain criteria, such as frequency of use or to reduce redundancy of text data entry and re-order menus or submenus to provide expedient data entry of the most frequently entered selections.

52 Claims, 30 Drawing Sheets

THE PHOTO IS CAPTURED, ACCEPTED, SELECTED AND INSERTED DIRECTLY INTO THE RECORD.

U.S. PATENT DOCUMENTS

| | | | |
|---|---|---|---|
| 2002/0038076 A1* | 3/2002 | Sheehan et al. | 600/200 |
| 2002/0047905 A1* | 4/2002 | Kinjo | 348/207 |
| 2002/0055861 A1* | 5/2002 | King et al. | 705/4 |
| 2002/0093493 A1* | 7/2002 | Michaeli et al. | 345/173 |
| 2002/0099592 A1 | 7/2002 | Donahue | 705/10 |
| 2002/0116254 A1* | 8/2002 | Stein et al. | 705/11 |
| 2002/0119433 A1 | 8/2002 | Callender | 434/322 |
| 2002/0188522 A1* | 12/2002 | McCall et al. | 705/26 |
| 2002/0198755 A1* | 12/2002 | Birkner et al. | 705/8 |
| 2003/0023443 A1* | 1/2003 | Shizuka et al. | 704/260 |
| 2003/0036684 A1* | 2/2003 | Hood et al. | 600/300 |
| 2003/0043057 A1* | 3/2003 | DiDomenico et al. | 340/933 |
| 2003/0064685 A1* | 4/2003 | Kim | 455/90 |
| 2003/0069716 A1* | 4/2003 | Martinez | 702/188 |
| 2003/0140073 A1 | 7/2003 | Worstel | 345/160 |
| 2003/0178485 A1* | 9/2003 | Lee | 235/435 |
| 2003/0210264 A1 | 11/2003 | Macrossan | 345/751 |
| 2003/0236099 A1* | 12/2003 | Deisher et al. | 455/522 |
| 2004/0008253 A1* | 1/2004 | Monroe | 348/143 |
| 2004/0098269 A1* | 5/2004 | Wise et al. | 705/1 |
| 2004/0117209 A1* | 6/2004 | Brown | 705/2 |
| 2004/0128140 A1* | 7/2004 | Deisher | 704/275 |
| 2004/0128613 A1* | 7/2004 | Sinisi | 715/500 |
| 2004/0170460 A1* | 9/2004 | Mokuya et al. | 400/76 |
| 2004/0186357 A1* | 9/2004 | Soderberg et al. | 600/300 |
| 2004/0193824 A1* | 9/2004 | Johnson | 711/170 |
| 2005/0164783 A1* | 7/2005 | Paulsen et al. | 463/29 |
| 2006/0171683 A1* | 8/2006 | Battaglia et al. | 386/107 |

OTHER PUBLICATIONS

Cross et al., Layered Annotaitons of Digital Images for Data Collection in the Field, IEEE 2003, pp. 1-6.*

Buyukkokten, O et al., "Efficient Web Browsing on Handheld Devices Using Page and Form Summarization", ACM Transactions on Informatoin Systems, vol. 20, No. 1, Jan. 2002, pp. 82-115.

Buyukkokten, O et al., "Seeing the Whole in Parts: Text Summarization for Web Browsing on Handheld Devices", ACM May 2001, pp. 652-662.

Namboodiri, A et al., "On-line Script Recognition" Pattern Recognition, Aug. 2002, vol. 3, pp. 736-739; and.

Kelly, S., "Paperless aircraft inspection", Communications News, May 2000, p. 108.

* cited by examiner

CLIENT DATA SCREEN INCLUDES NAME, TIME/DATE STAMP WITH GPS/GIS OR BARCODE WAND REPORT, TYPE OF DATA COLLECTION BEING PERFORMED DATE, INSPECTOR NAME, ETC.

GEOGRAPHY SCREEN PROMPTS CAPTURE OF BARCODE ID, ROOM AND FLOOR NUMBERS, AREA TYPE, TRANSDUCER READING, ETC.

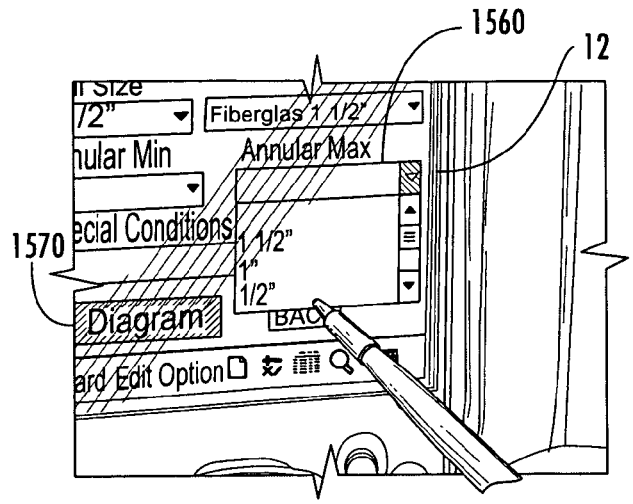

DATA SUCH AS MEASUREMENTS OR FIELD CONDITIONS ARE COLLECTED BY MANUAL INPUT OR READ DIRECTLY INTO THE HANDHELD DEVICE TEMPLATE UTILIZING A MEASURING DEVICE CONNECTED DIRECTLY INTO THE UNIT.

FIG. 8H

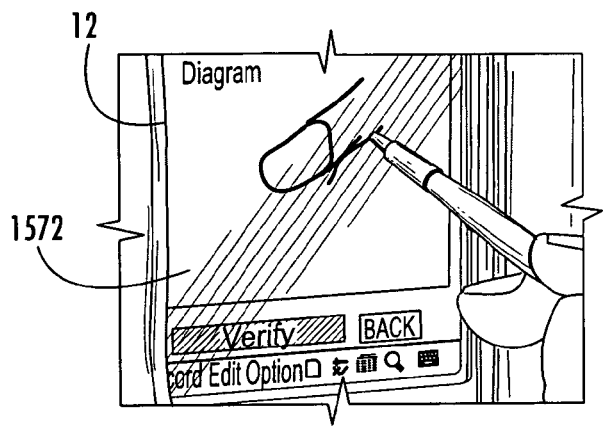

THE GREEN DIAGRAM BUTTON SHOWN IN THE PREVIOUS SLIDE BRINGS YOU TO A SKETCH SCREEN FOR INPUT OF A SKETCH DIRECTLY INTO THE RECORD AT A TIME OF CAPTURE.

FIG. 8I

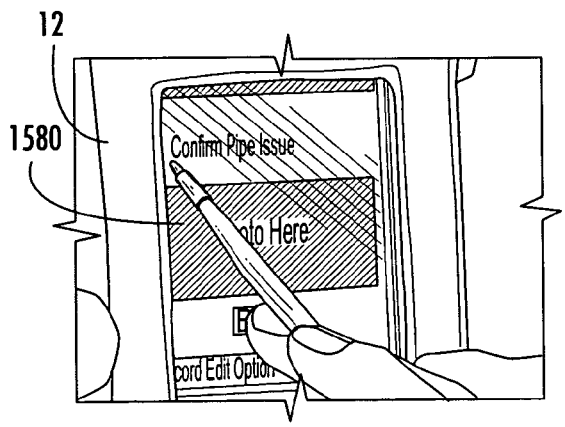

THE PHOTO INTEGRATION SCREEN PROMPTS THE OPERATOR TO TOGGLE OVER TO THE BUILT IN CAMERA AND COLLECT A PHOTO OF THE ITEM TO BE INSERTED INTO THE RECORD AT TIME OF CAPTURE.

FIG. 8J

THE PHOTO IS CAPTURED, ACCEPTED, SELECTED AND INSERTED DIRECTLY INTO THE RECORD.

SCREEN TAP INSERTS PHOTO(S) INTO RECORD

ADDITIONAL DATA IS COLLECTED AND RECORDED AS REQUIRED.

SIGNATURE IS COLLECTED AND INSERTED DIRECTLY INTO THE RECORD AT TIME OF CAPTURE

FIG. 9A

| Item# | Location | Penetration | Type | Material | Diameter | Insulation | Construction System | Min Annular | Max Annular | Special Conditions |
|---|---|---|---|---|---|---|---|---|---|---|
| 1 | Above Door 501 | Duct | HVAC | Steel | 8X18" | No | Concrete Block | 1" | 3" | No Damper |
| 2 | Above Door 501 | Conduit | Electrical | Steel | 3/4" | No | Concrete Block | 1 1/2" | 2" | Eccentric |
| 3 | Above Door 501 | Bundled Cable | Electrical | Mixed Wiring | 2" | No | Concrete Block | 1/4" | 1/2" | N/A |
| 4 | Above Door 501 | Pipe | Water | Copper | 1 1/2" | No | Concrete Block | 0" | 1" | Partial Point Contact 15% |
| 5 | Above Door 501 | Pipe | Water | Copper | 1" | No | Concrete Block | 1/2" | 1/2" | N/A |
| 6 | Above Door 501 | Pipe | Steam | Iron | 1 1/2" | Fib-1/2" | Concrete Block | 3/4" | 3/4" | N/A |
| 7 | Above Door 501 | Pipe | Steam | Iron | 1 1/2" | Fib-1/2" | Concrete Block | 3/4" | 3/4" | N/A |
| 8 | Above Door 501 | Bundled Cable | Electrical | Mixed Wiring | 1" | Plastic Sleeve - 1/8" | Concrete Block | 1/2" | 1/2" | N/A |
| 9 | Above Door 501 | Conduit | Primary Electric | Steel | 4" | No | Concrete Block | 6" | 6 1/2" | N/A |
| 10 | Above Door 501 | Bundled Cable | Electrical | Armored Cable | 1 1/2" | No | Concrete Block | 1/4" | 1/4" | Partial Point Contact 15% |
| 11 | Above Door 501 | Bundled Tubing | Lab Services | Copper | 3" | No | Concrete Block | 0" | 1" | N/A |
| 12 | Above Door 501 | Pipe | Lab Services | Iron | 2" | No | Concrete Block | 1" | 1" | N/A |
| 13 | Above Door 501 | Pipe | Electrical | Conduit | 1" | No | Concrete Block | 1/2" | 1/2" | N/A |
| | | | | Mixed Penetrants | | | | | | |
| 14 | Above Door 501 | Bundled Cable | Electrical | Wire | 1/2" | No | Concrete Block | 3" | 6" | Membrand Penetration |
| 15 | Above Door 501 | Bundled Cable | Electrical | Armored Cable | 1/2" | No | Concrete Block | | | |
| | | | | Conduit | 1" | No | Concrete Block | 1" | 1 1/2" | Eccentric |
| | | | | Armored Cable | 1/2" | No | Concrete Block | | | |
| | | | | | Linear Feet | | | Min Gap | Max Gap | |
| 18 | Above Door 501 | Joint Gap | Wall to Ceiling | | 8' | | Concrete Block/Concrete Deck | 1 1/2" | 2" | Static |

ISSUES BY ROOM

Kluso Solutions Inc.

| Client | Building | Floor | Room |
|---|---|---|---|
| Anheiser-Busch, Inc. | Power Plant | 9 | 1 |

Barcode 1234

| FireStop Issue | Issue Type | Size | Min | Max | Materials | Construction System | Special Conditions |
|---|---|---|---|---|---|---|---|
| Floor Penetration | Duct | 2' | 1' | 1' | Aluminum | Brick | Eccentric |
| Floor Penetration | Duct | 2' | 1' | 1' | Aluminum | Brick | Eccentric |

| Client | Building | Floor | Room |
|---|---|---|---|
| ASI Management | Power Plant | 6 | 0 |

Barcode

| FireStop Issue | Issue Type | Size | Min | Max | Materials | Construction System | Special Conditions |
|---|---|---|---|---|---|---|---|
| Floor Penetration | Cable/Bundle/Tray | | | 1' | Aluminum | Brick | |

| Client | Building | Floor | Room |
|---|---|---|---|
| GSA | Power Plant | 0 | 0 |

Barcode

| FireStop Issue | Issue Type | Size | Min | Max | Materials | Construction System | Special Conditions |
|---|---|---|---|---|---|---|---|
| Floor Penetration | Duct | | | 1' | Aluminum | Brick | |

Friday, September 16, 2001

Page 1 of 1

Summary Report

FIG. 9B

 Work Order Number : 134-90-B54

Repair Order

Date 10/13/03

Client Information:

Client  Anheuser Busch, Inc          Location  Newark Brewery

Address  100 Rt 1&9, Newark, NJ  07070  Building Number 4  Room Number 437A  Print Number  6-76y

Issue Information:

Type  Through Penetration                    Trade Required     Fire Stop Contractor Description  Copper pipe through cmu block wall, 2 hour rated in entry area of room.

Priority  HIGH    UL System Selected  UL# CAJ-4501-A  Special Instructions  This is a Safety Issue Producers Signatur                               Approval Signature

Assignment of Work:

Contractor Assigned  Ace Construction Inc    ☐ Provide Estimate for Approval
                                              ▨ Time and Materials Work Contact Name     Joe Sims                     ▨ Estimated Cost $ 600.00

Telephone Number 732-528-0473

 This work is included in our existing contract with the assigned contractor and must be completed at no additional cost to the existin contract for services.

Deficiency Digital Photo

Open Space

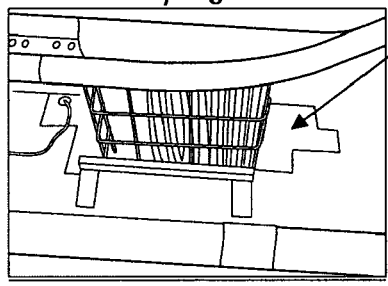

Approvals and Inspections

■ Work inspected and approved

Signature

10/13/03
Date

Time and Date: 10/20/2003 12:06:13 PM

FIG. 10

SYSTEM AND METHOD FOR MOBILE DATA COLLECTION

CROSS REFERENCE TO RELATED APPLICATION

This application claims the benefit of U.S. Provisional Patent Application No. 60/419,762, filed Oct. 21, 2002, the entirety of which is hereby incorporated by referenced into this application.

BACKGROUND OF THE INVENTION

1. Field of the Invention

The present invention relates to a system and method for mobile data collection in which a handheld device is used to collect and integrate multiple types of data, such as data related to building inspections. One or more reports of the integrated data can be generated.

2. Description of Related Art

Inspection of the premises for compliance with building and safety codes is typically performed by an inspector reviewing the site and manually collecting data, such as by writing the data in a notebook. The collected data is later manually inserted into an inspection report. Attempts have been made to gather data of construction and hazardous materials using a handheld portable device.

U.S. Pat. No. 6,078,255 describes a floor safety inspection system. A portable data collector and probe are used to collect information. A plurality of buttons are each encoded with a hazard identifier. As an inspector tours the business premises, the probe of the portable data collector is brought into proximity of appropriate hazard buttons. The data is downloaded in a cradle/modem combination to a central computer. The central computer can generate reports of compliance with a predetermined floor safety inspection procedure.

U.S. Pat. No. 6,594,621 describes a system and method for determining conditions of a plant at inspection sites identified by identifier codes. A remote processing device with an inspection transducer can sense and store at least one characteristic of equipment at the inspection site. The transducers are connected to a transducer adapter, such as an input/output card of a remote computer. The remote computer can be a personal computer. A portable processing device is fitted with a barcode reader to allow the device to read the identification codes. The operator can be prompted by the portable processing device to perform particular measurements on the equipment using the remote processing device. The portable processing device may also request the operator to make certain observations and enter qualitative conditions of the measurements.

A central processor communicates with and uploads from the remote processing device and portable processing device the measured characteristic and identification codes. The central processor produces a signal signifying the condition of some aspect of the plant in response to the measured characteristic and the identification codes. A camera can be used to take still images of changing aspects of the facility. The still images are stored for later retrieval, months or years later, to provide a comparison of how the facilities change over time.

It is desirable to provide an improved handheld device for data collection of inspection information combining, integrating and manipulating one or more types of data, such as text, GPS, sketches, barcodes and digital photographs, and generation of an associated report.

SUMMARY OF THE INVENTION

The present invention relates to a system and method for mobile data collection in which a handheld device collects and integrates one or more forms of data. For example, data can include text, images, digital photographs, digital video, barcodes, digital sketches, digital signatures, audio, GPS, GIS, document scan, print scan, CAD/CAM scan, and interactive data retrieval from other systems. Firmware on the handheld device provides a data collection template as a visual display on the handheld device to provide a user interface for collecting the forms of data. The data collection template can comprise consecutive questions nested in menus or submenus, data collection prompts and commands for guiding a user through data collection activities. In one embodiment, firmware on the handheld device includes software to allow toggling between the data collection templates and digital camera functions of the handheld device, this allows for inspection of a digital photograph into a record at the time of capture. Firmware can also include software to allow overlaying of an electronic sketch over the digital photograph at the time of capture. A permanent record is generated from the collected data. The permanent record is synchronized to manipulate data in the record for later use such as optimization of the data collection template, production of reports from the collected data and storage of the collected data. For example, the data collection template can be optimized during use of the handheld device to organize selections on the data collection template based on certain criteria, such as frequency of use or to reduce redundancy of text data entry and re-order menus or submenus to provide expedient data entry of the most frequently entered selections. Standard and customized reports can be generated from the collected data to provide comprehensive reporting.

The handheld device can be used in parallel or in series with one or more other handheld devices and the collected data from all the devices can be synchronized and used in optimization of the data collection template and production of reports. Standard and customized reports can be generated from the collected data to provide comprehensive reporting. The system for mobile data collection has universal appeal and appeals to all industries and many application in which data collection is used. For example, the system for data collection can be used in building inspections, fire barrier management applications and inventory tracking of safety hazards. The invention will be more fully described by reference to the following drawings.

BRIEF DESCRIPTION OF THE DRAWINGS

FIG. 8H is a schematic diagram of an example of measured or field condition entries for data collection template for use in fire barrier management.

FIG. 8I is a schematic diagram of an example of sketch screens for data collection template for use in fire barrier management.

FIG. 8J is a schematic diagram of an example of a photo interaction screen for data collection template for use in fire barrier management.

FIG. 8O is a schematic diagram of an example of a continue inspection screen for data collection template for use in fire barrier management.

FIG. 9A is a schematic diagram of an inspection report for use in fire barrier management.

FIG. 9B is a schematic diagram of a summary report for use in the fire barrier management.

FIG. 10 is a schematic diagram of a work order for use in fire barrier management.

DETAILED DESCRIPTION

Figure 1:
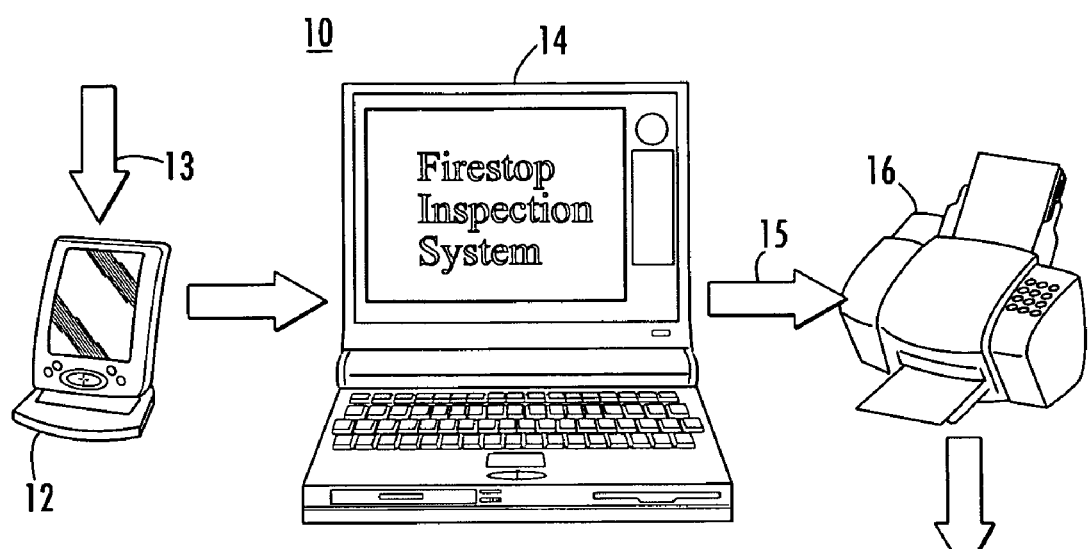
FIG. 1 is a schematic diagram of a system for mobile data collection in accordance with the teachings of the present invention.
Figure 2A:
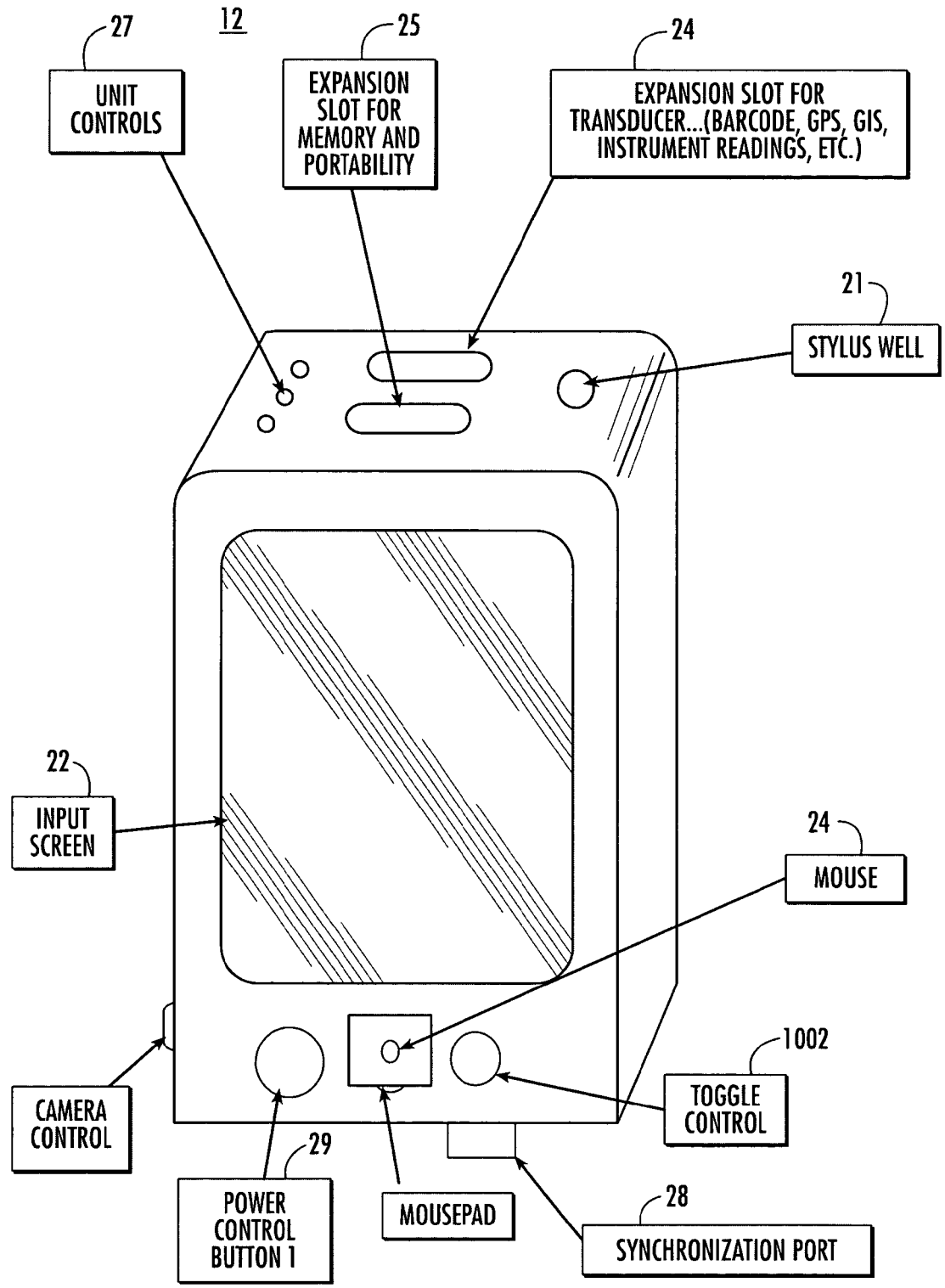
FIG. 2A is a schematic diagram of a background top view of a handheld device used in the system for mobile data collection.
Figure 2B:
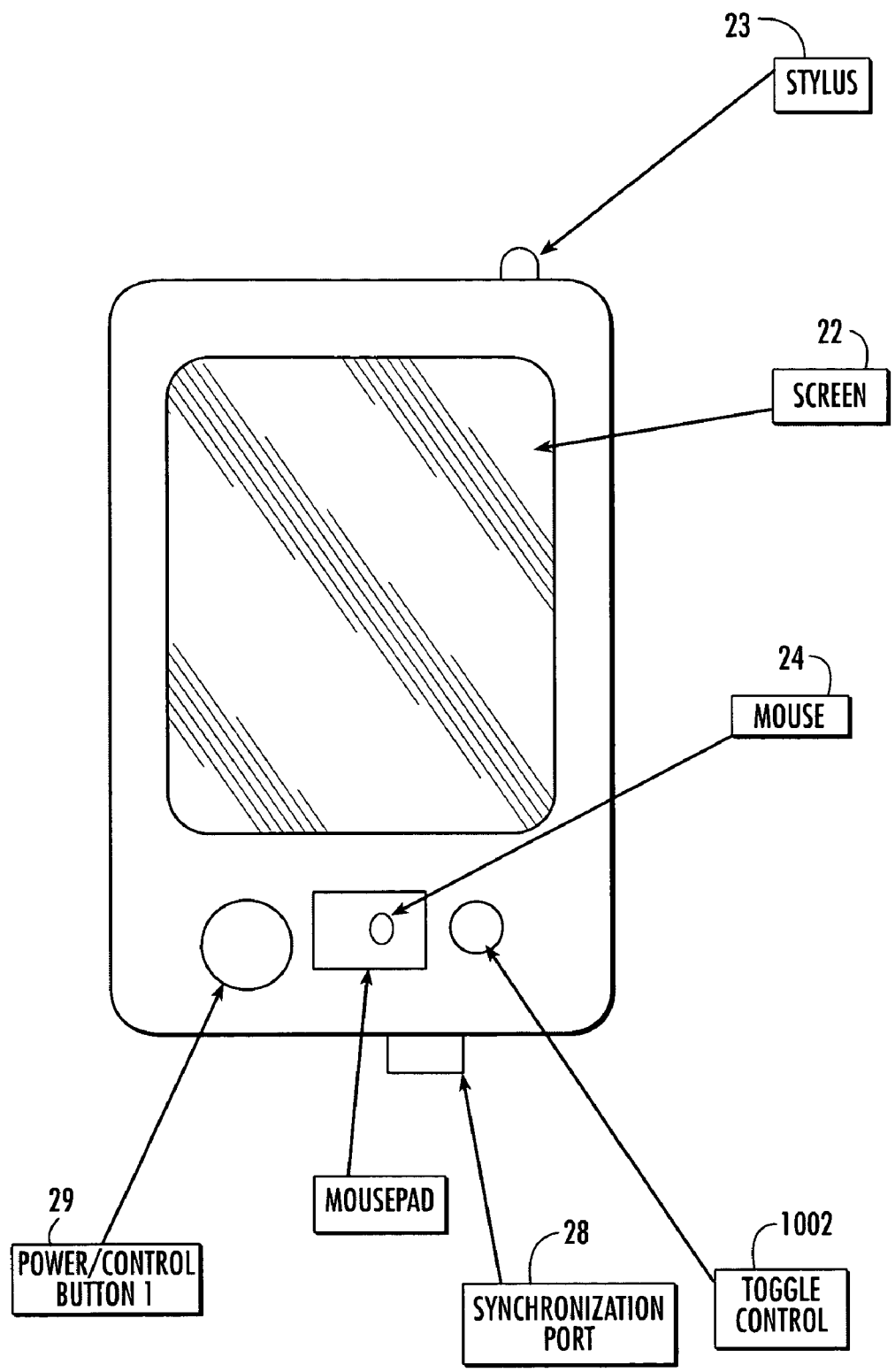
FIG. 2B is a schematic diagram of a back view of the handheld device.
Figure 2C:
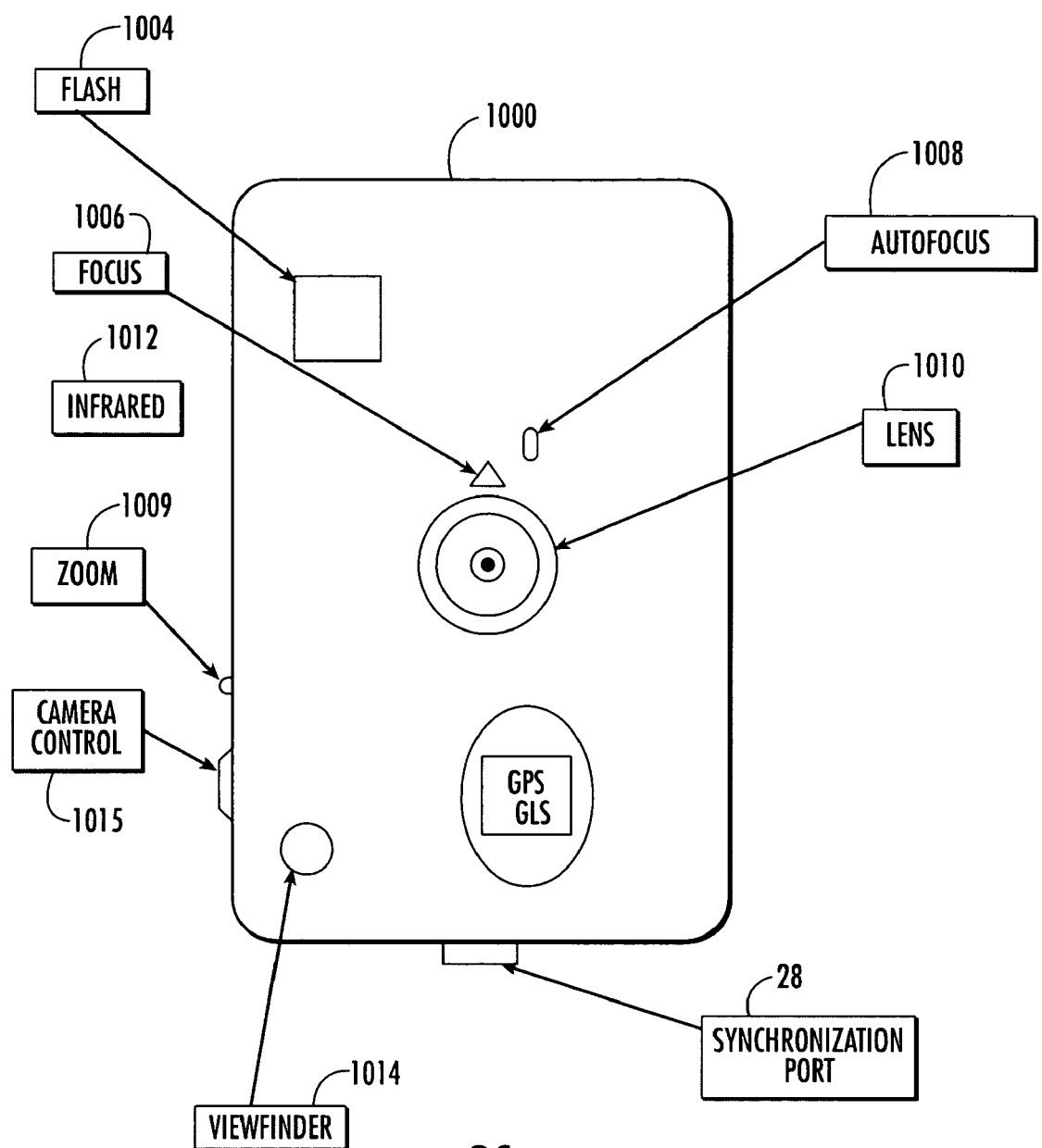
FIG. 2C is a schematic diagram of a front view of the handheld device.
Figure 2D:
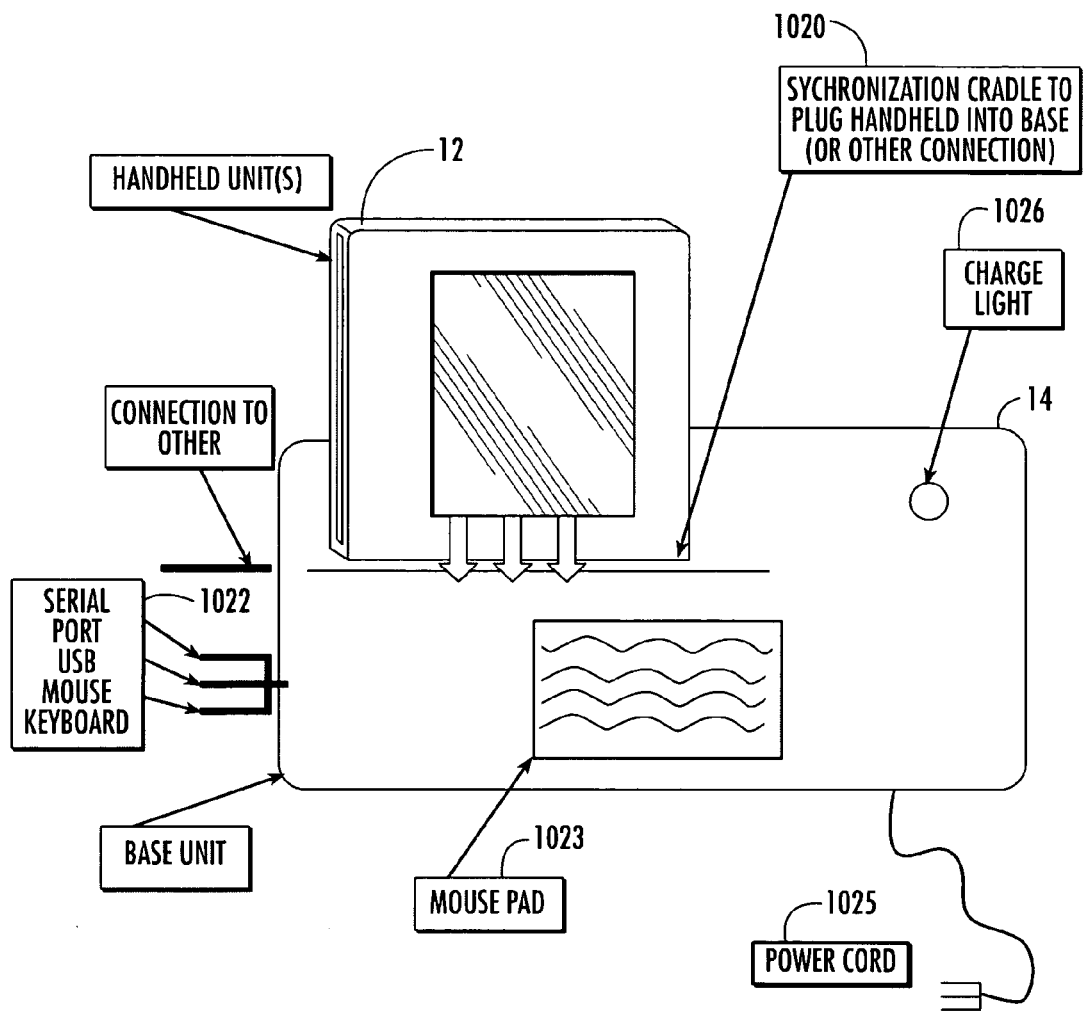
FIG. 2D is a schematic diagram of the handheld device in combination with a central processing unit.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a schematic diagram of a system for mobile data collection 10 in accordance with the teachings of the present invention. One or more handheld devices 12 collects and temporarily stores multiple types of data 13. For example, data 13 can include text, digital photographs, digital video, barcodes, sketches, digital signatures, audio, GPS, GIS, document scan, print scan, CAD/CAM scan, interactive data retrieval from other systems data and other conventional forms of data which are known in the art. Handheld device 12 communicates with central processing system 14 for uploading and down loading data 13 to one or more central processing systems 14. Handheld device 12 can use one or more methods for communicating with central processing system 14 including cable, WIFI, DSL, dial-up modem, CD-Rom, DVD, floppy disc, flashcard, memory stick or other methods known in the art for data delivery. Central processing system 14 can be a portable storage and processing unit, such as a laptop or equivalent computing device. Central processing system 14 can include one or more databases for storing data collected by system for mobile data collection 10. Central processing system 14 formats reports 15 which can be printed on printer 16, as described in more detail below.

An embodiment of handheld device 12 is shown in FIGS. 2A-2D. For example, handheld device 12 can include a PDA or an equivalent conventional handheld computing device. Handheld device 12 includes data input screen 22. Data input screen 22 can be a touch screen. Stylus well 21 houses stylus 23. Input stylus 23 interacts with data input screen 22 for selecting particular entries shown on data input screen 22 or sketching over data input screen 22 or a portion thereof, as described in detail below. Mouse 24 interacts with data input screen 22 for selecting entries shown on data input screen 22.

Handheld device 12 is fitted with expansion slot 24 for connecting to a transducer or information from engineering tools or field measuring equipment. For example, a barcode reader can be a wand connected to expansion slot 24 in handheld device 12. Alternatively, a digital camera 1000 can be connected or installed on handheld device 12. For example, field measurement equipment can include one or more of the following: torque gauge, tag measure, pressure gauge, micrometer, hardness meter, thickness gauge, speed gauge, velocity gauge, air flow gauge, wind speed gauge, temperature gauge, humidity gauge, voice recognition hardware, voice capture hardware, retinal scan hardware, finger print scan hardware, environmental data collector, follicle code, breathalyzer reading hardware, face recognition hardware, IR camera, radar, microwave transmission, radiation transmission, telephone transmission, cable transmission, low voltage transmission, gamma ray transmission, electric current, medical instrument, chemical composition device and other measuring devices which are known in the art.

Unit controls 27 are used for controlling function of handheld unit 12. Expansion slot 25 can be used to connect to portable memory or communication devices. Synchronization port 28 attached to handheld device 12 is used for coupling handheld device 12 to central processing system 14. Handheld device 12 includes power controls 29, such as a rechargeable battery or power cord.

Toggle control 1002 coupled to handheld device 12 can toggle between capture of a digital photograph with digital camera 100 and entry of data with data input screen 22. Digital camera 1000 can include flash 1004. Digital camera 1000 can provide focusing with focus 1006, auto focus 1008 and zoom 1009 to adjust lens 1010. Infrared 1012 provides barcode read capability. Viewfinder 1014 provides a user interface to position up digital camera 1000. Camera control 1015 provides additional control of digital camera 1000. GPS or GIS interfaces 1019 can be installed on handheld device 12. GPS or GIS interfaces 1019 can be permanently installed on camera or added in the field with a flash card attachment.

Handheld device 12 can be coupled or plugged into central processing system 14 using synchronization cradle 1020. Synchronization cradle 1020 can receive one or more handheld units 12. Central processing system 14 includes interface ports 1022 such as a serial port, USB, mouse port or keyboard interface. Mouse port 1003 can be mounted on central computer system 12. Communication port 1024 can provide communication to other systems or networks. Power means 1025 provides power requirements, such as a rechargeable battery or power cord. Charge light 1026 provides an indication of coupling of handheld device 12 to central processing system 14 and possible charging of power means 29, such as batteries used in handheld device 12.

Figure 3:
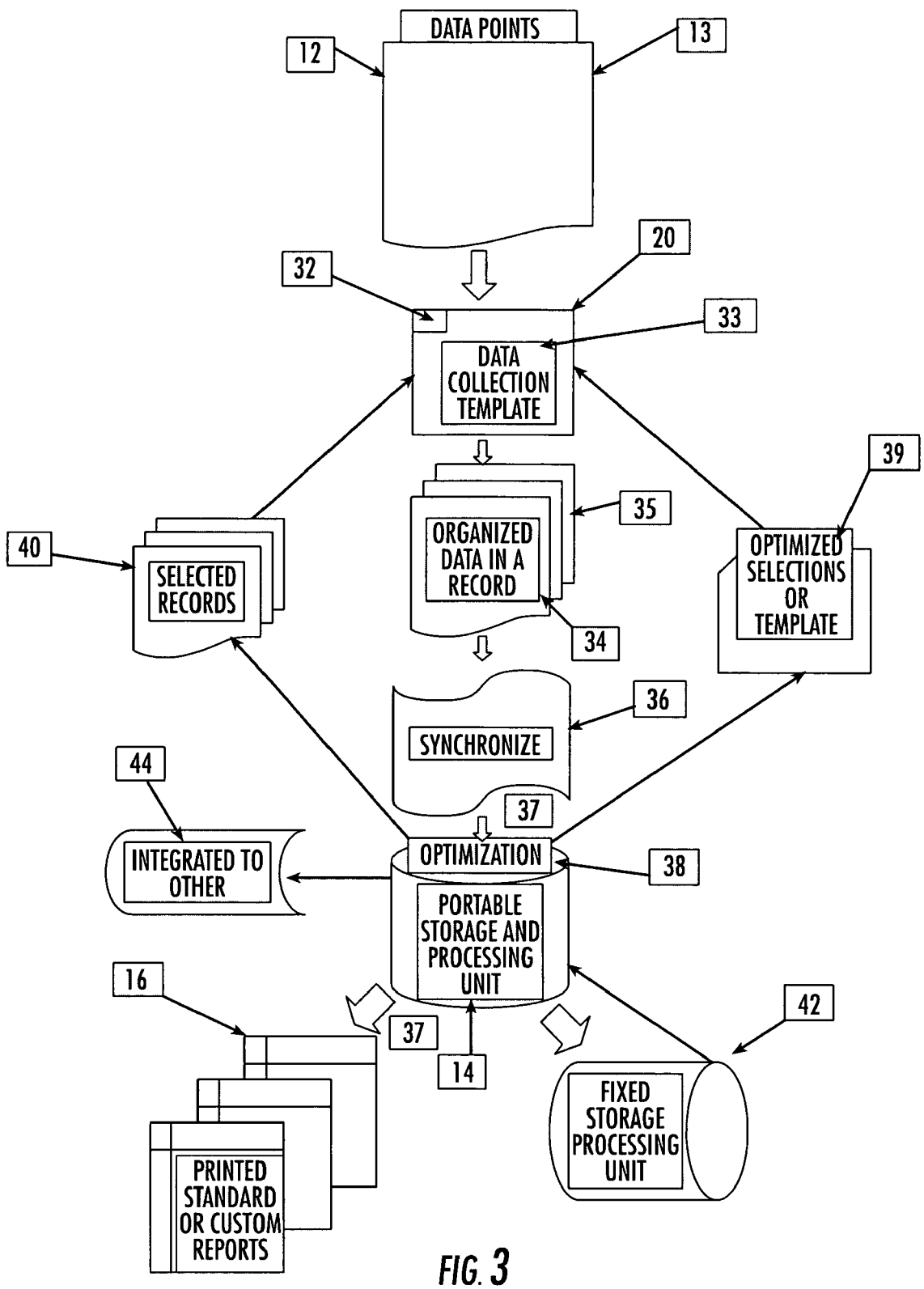
FIG. 3 is a schematic diagram of a configuration of the system and software modules.
Figure 4:
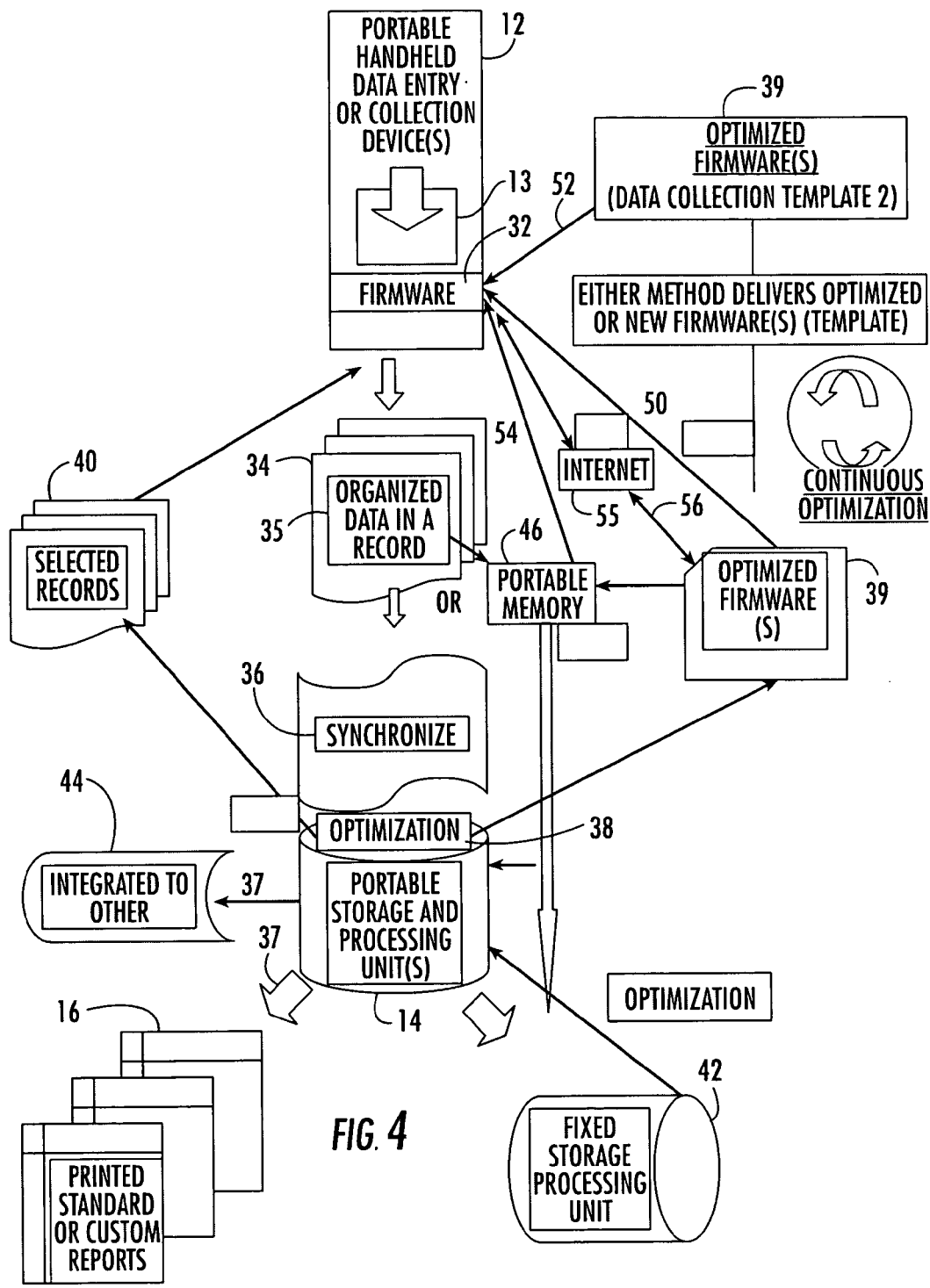
FIG. 4 is a schematic diagram of a configuration of the system of software modules.
Figure 5:
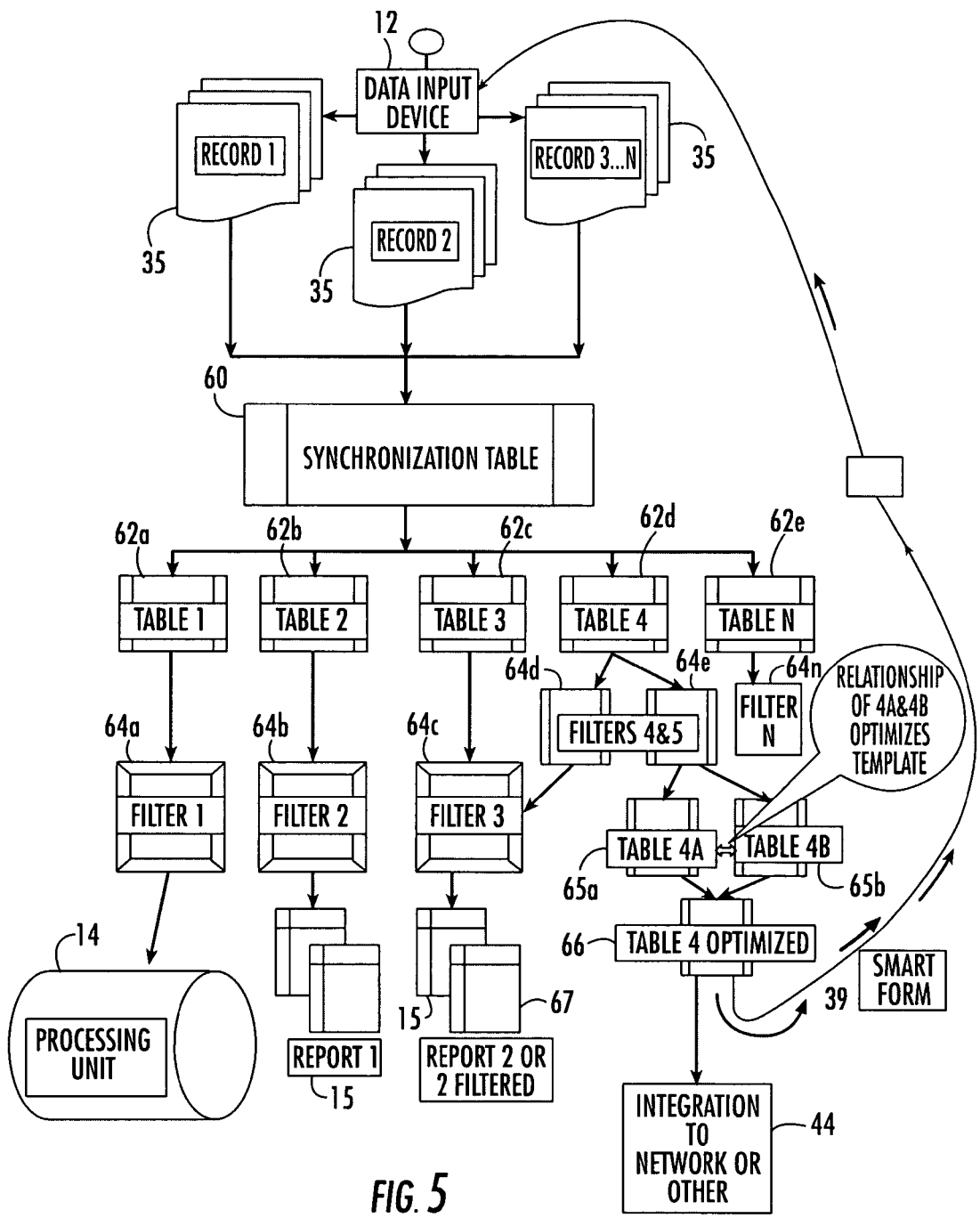
FIG. 5 is a schematic diagram of a configuration of the system and software modules used in an optimization process.

Software 30 loaded onto handheld device 12 provides an interface for inputting data 13 and integrating collected data 13, as shown in FIGS. 3-5. Firmware 32 on handheld unit 12 allows for data collection activities from any datapoint format of data 13 using only handheld device 12. Firmware 32 can comprise computer programs contained permanently in handheld device 12 as read only memory. Firmware 32 can be used to generate automated data collection templates on handheld device 12. Firmware 32 can generate data collection template 33 using hardware/software integration software to provide an integrated solution combining hardware capabilities in a firmware application.

Data collection templates 33 are used to provide communication of a data collection operation to system user. Data collection template 33 provides a user interface for inputting data 13. For example, data collection template 33 may prompt the user visually, by sound, code, vibration or any means known in the art for guiding the data collection process and providing a gateway to format information into a record in handheld device 12. Reference identifiers can be used in data collection template 33 to reference predefined codes, such as building, safety, electrical fire and the like. For example, data collection template 33 can be an electronic form, including one or more menus or submenus for guiding a user during data entry of various types of data 13. In one embodiment, photo and/or a barcode at time of capture can be inserted into data collection template 33 and combined with user text entered in data collection template 33.

Firmware 32 includes integration module 34 for organizing collected data 13 into record 35. Record 35 is a permanent record of data 13. Firmware 32 includes software to allow toggling between data collection template 33 and digital camera functions of handheld device 12. Accordingly, a data collection template 33 can prompt for a digital photograph to be taken with handheld device 12. Thereafter, the digital photograph is inserted into data collection template 33 at time of capture and becomes part of record 35. Firmware 32 can also include software to allow for overlaying of an electronic sketch over the digital photograph at time of photo capture for insertion directly into record 35. Firmware 32 can also provide software for collection of a digital signature. For example, an inspector's digital signature can be captured at the time of inspection.

Synchronization module 36 interacts with firmware 32 to receive records 35 and remove collected data 13 of handheld device 12 after synchronization. Synchronization module 36 integrates data 13 from one or more records 35 for manipulating data 13 and allowing sorting of collected data by a selected criteria of data 13 into one or more classifications to form synchronized data 33. Synchronization module 36, for example, can manipulate data 13 based on type of entry, such as length of pipe, color of pipe, type of barrier, and the like. For example, handheld device 12 can be used at multiple locations and a field representing each location can be entered in data collection template 33, thereafter multiple location datapoint collection can be manipulated and sorted by location at the end of the data collection process.

Optimization module 38 provides optimization of synchronized data 37 based on predefined criteria. For example, selections of one or more data collection templates 33 can be optimized to reduce redundancy of text data entry and re-order the menus on data collection template 33 based on a criteria such as their frequency of use or a desired information request, as described in detail below. Optimization module 38 can also add to the previously generated data collection template 33 any new answers entered in data collection template which were not previous entries of data collection template 33. Optimization module 38 can manipulate data 35 based on a statistical program. Optimized selections or an optimized data collection template 39 can be continuously generated by optimization module 38. Optimized selections or an optimized data collection template 39 are forwarded to handheld device 12 to be integrated or to replace the previously generated data collection template 33 and to be used for subsequent data collection to provide continuous optimization. Previously generated records 40 can be forwarded from optimization module 38 to handheld device 12. Previously generated records 40 can be used to retrieve entries which can be entered into the current data collection template 33 or optimization data collection template 39.

Synchronization module 36 and optimization module 38 can be performed at central processing system 14. Synchronization data 37, data 13 collected from data collection template 33 in optimization module 38 and data collection template 33 itself can be forwarded to fixed storage and processing unit 42. For example, fixed storage and processing unit 42 can be one or more personal computers or servers. During data transfer between any of handheld devices 12, central processing system 14, printer 16 or fixed storage processing unit 42, compression and synchronization techniques can be used to provide efficient transfer between devices. Encryption software can be used in handheld device 12 or central processing system 14 to provide security protection of the data, software or system.

Alternatively, data 13 organized in records 35 can be stored in portable memory 46 and forwarded to fixed storage and processing unit 42, as shown in FIG. 4. For example, portable memory 46 can be a memory stick, CD, chip, disk, DVD and the like.

Synchronization data 37, data 13 collected from data collection template 33 in optimization module 38 and the data collection template 33 itself or optimized selections or an optimized data collection template 39 can be integrated to network 44. Report generating module 46 generates standard or customized report with synchronization data 37. Report generating module 46 can provide an interface for one button printing of standard or customized reports. Reports can be printed on printer 16 or graphically displayed on a display such as a computer monitor.

Data from records 35 can alternatively be grouped and formatted into files at central processing unit 14 to integrate into client software packages such as, but not limited to, Customer's Computerized Maintenance Management System (CMMS), product selectors, estimators and ERP systems over network 44. The files can be sent electronically via e-mail or uploaded via client VPN/LAN/WAN or sent on external portable storage devises such as, but not limited to, flash cards, USB storage devices, CDs, DVDs, portable hand devices, tape, computerized maintenance management system and the like.

In one embodiment, optimized selections or an optimized data collection template 39 is directly forwarded to firmware 32 with connection 50, to be used for subsequent data collection, as shown in FIG. 4. Alternatively, optimized selections or an optimized data collection template 39 is continuously optimized and forwarded to firmware 32 with connection 52 to be integrated into a previously generated data collection template 33. In another embodiment, optimized selections or an optimized data collection template 39 is forwarded using portable memory 46 to firmware 32 with connection 54. Alternatively, optimized selections or an optimized data collection template 39 is forwarded using internet 55 with connection 56.

FIG. 5 is a schematic diagram of an implementation of synchronization module 36 and optimization module 38. Data 13 stored in each of one or more records 35 is manipulated and formatted into synchronization table 60 in synchronization module 36. Synchronization table 60 moves data 13 from one or more records 35 into one or more tables 62a-62n. Data 13 in tables 62a-62n is manipulated using one or more filters 64a-64n. For example, data 13 in one of tables 62a-62n, such as table 62a labeled as table 1, can be integrated using one of filters 64a-64n, such as filter 64a, and the integrated data can be forwarded to central processing unit 14 to generate reports 15 or other tables 62a-62n. Data 13 in one of tables 62a-62n, such as table 62b labeled as table 2, can be integrated using one of filters 64a-64n, such as filters 64b-64c, to generate report 15 or filtered report 67. Data 13 in one of tables 62a-62n, such as table 62d labeled as table 4, can be integrated using a plurality of filters 64a-64n, such as filters 64d-64e, to generate relationship tables 65a-65b. Relationship tables 65a-65b can be combined into an optimized table 66 representing an optimized data collection template 39. Manipulated data in optimized data collection template 39 can be integrated into network 44. Optimized data collection template 39 is communicated back to handheld device 12 for use in future data collection applications. Optimized data collection template 39 can be referred to as a smart form since the template has been optimized based on user requirements.

Figure 6:
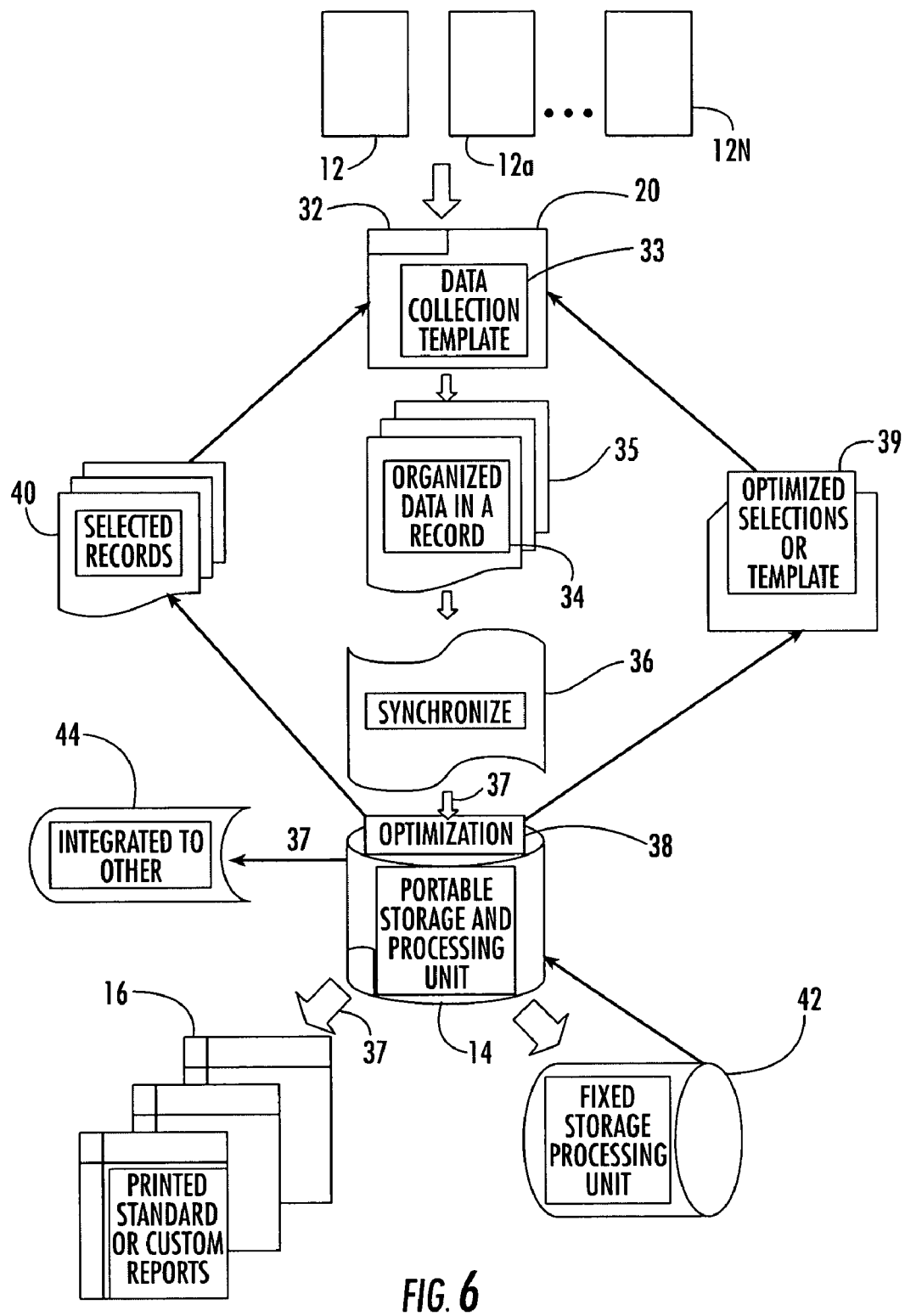
FIG. 6 is a schematic diagram of a configuration of the system of software modules including a plurality of handheld devices.

In an alternate embodiment, shown in FIG. 6, one or more handheld devices 12a-12n can be used in parallel or series with handheld device 12. Data 13 collected from handheld devices 12-12n is integrated with integration module 34 into records 35. Collected data from all of handheld devices 12-12n can be synchronized in synchronization module 36 and used in optimization module 38 for generating optimized data collection template 39.

Figure 7:
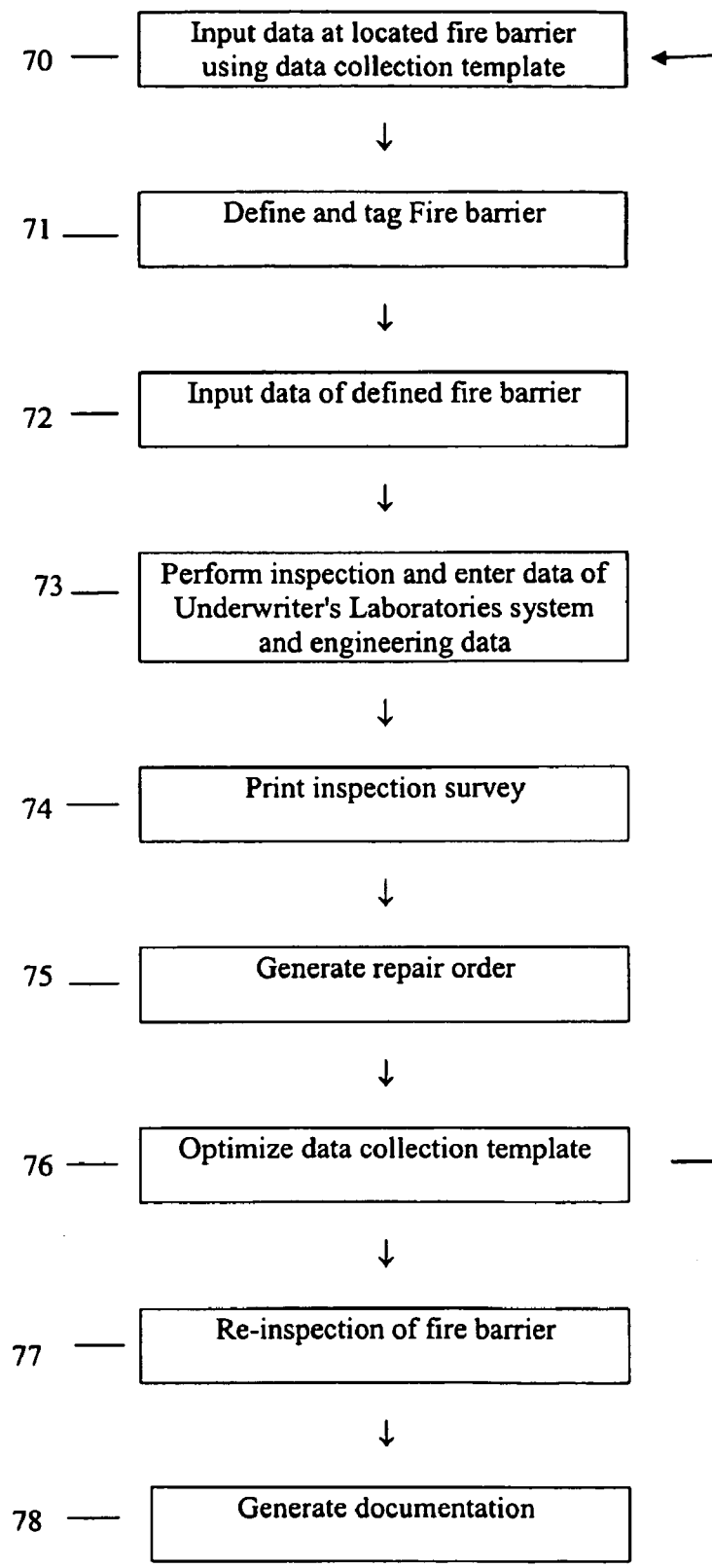
FIG. 7 is a flow diagram of a method for using the system for mobile data collection in a fire barrier management application.

FIG. 7 is a flow diagram of a method for using system for mobile data collection 10 in a fire barrier management application. An inspector performing the inspection of the fire barrier can carry handheld device 12 to the location of the fire barrier in block 70. The inspector can access data collection template 33 or optimized data collection template 39 at the site for inputting data 13 from the site. Previously generated records 35 or documents can be reviewed at handheld device 12 during data input to data collection template 33 or optimized data collection template 39. In block 71, the fire barrier is defined by the inspector and tagged. The barrier can be tagged by attaching a barcode to the barrier. In block 72, data related to the barrier, such as the attached barcode, is entered into data collection template 33 or optimized data collection template 39, such as by scanning the barcode. Data 13 entered can also include digital photographs of the barrier. In block 73, an inspection is performed by an inspector and Underwriter's Laboratories system data and engineering data is collected and entered into data collection template 35 or optimized data collection template 39.

Figure 8A:
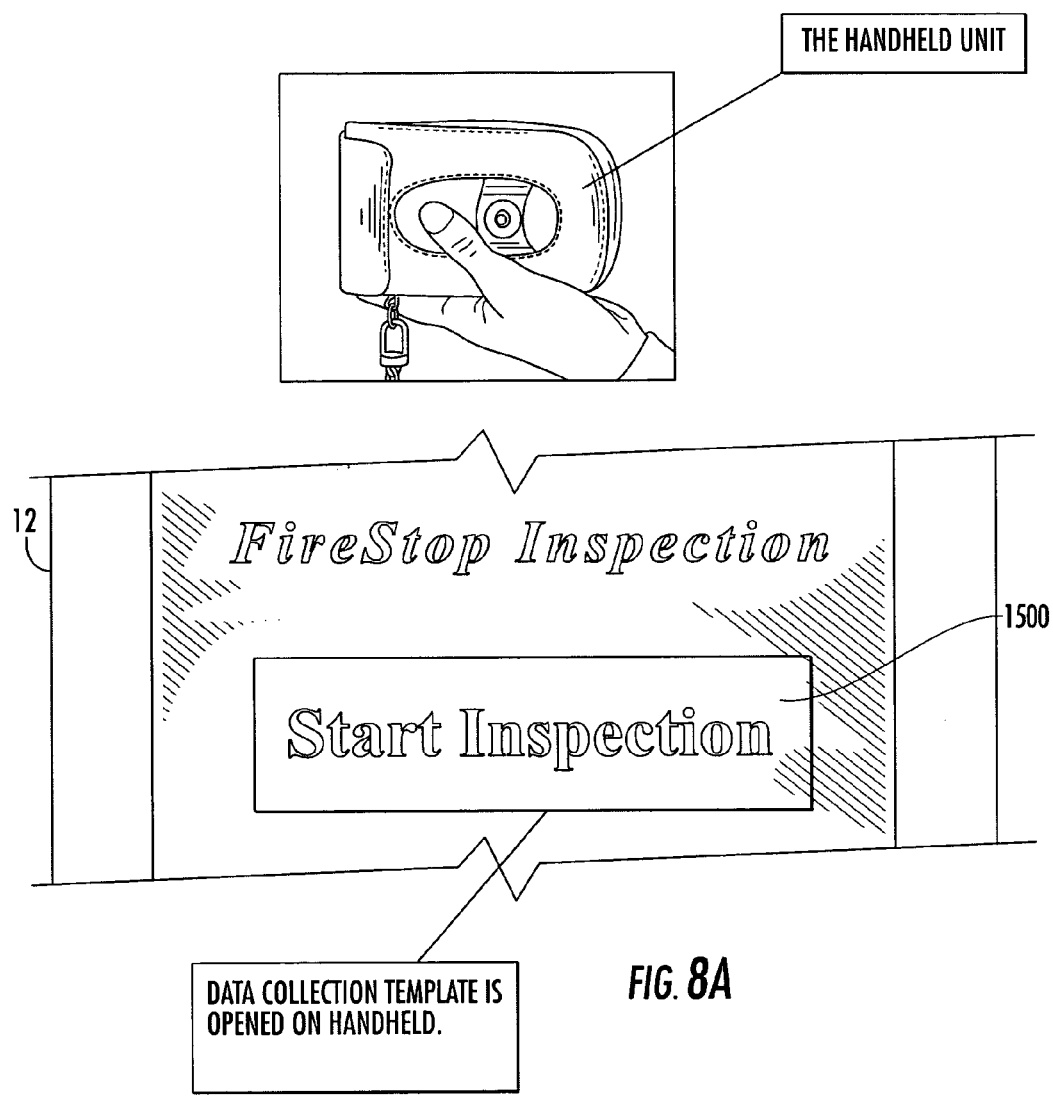
FIG. 8A is a schematic diagram of an example of a prompt for data collection template for use in fire barrier management.
Figure 8B:
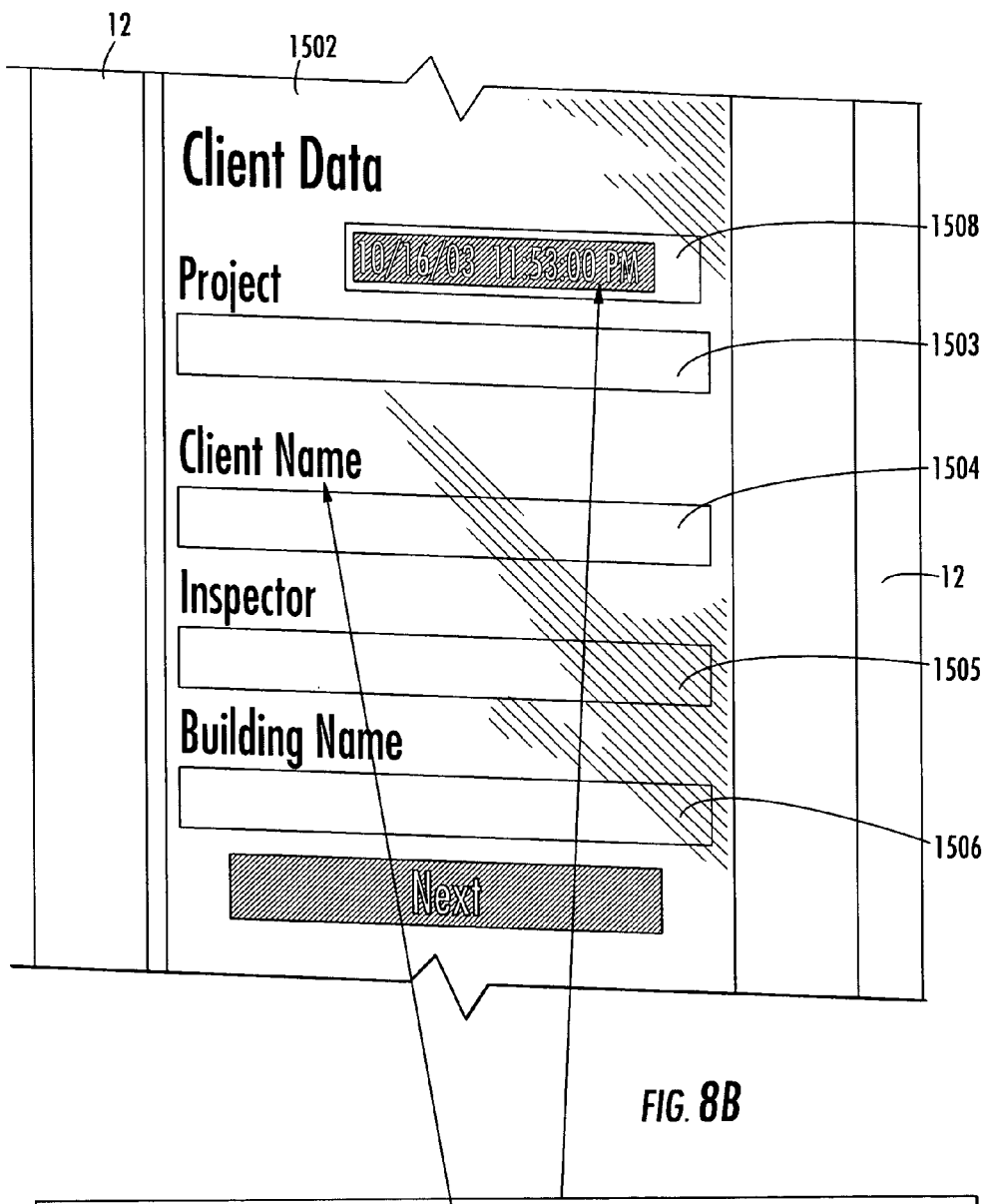
FIG. 8B is a schematic diagram of an example of a client data screen for data collection template for use in fire barrier management.
Figure 8C:
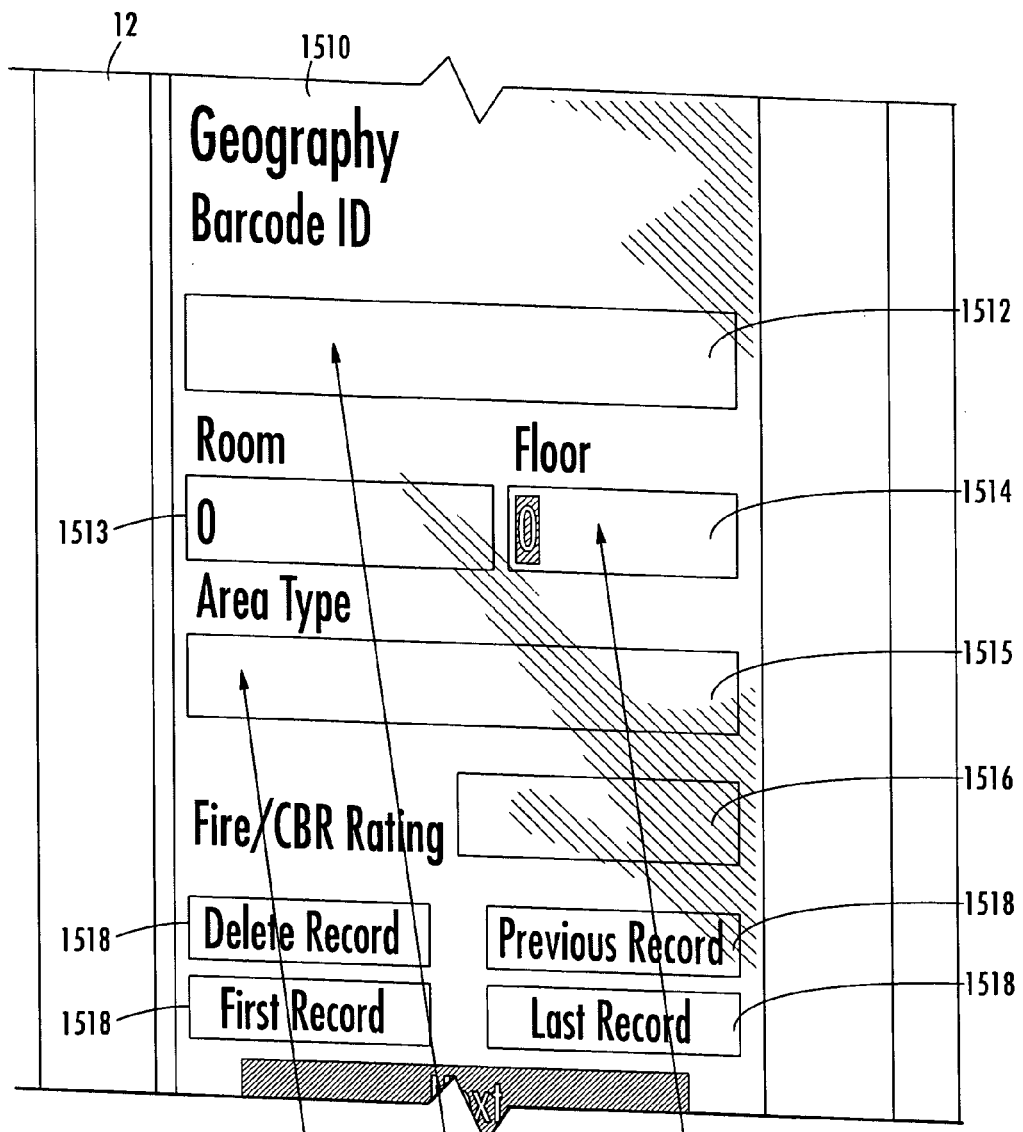
FIG. 8C is a schematic diagram of an example of a geography data screen for data collection template for use in fire barrier management.
Figure 8D:
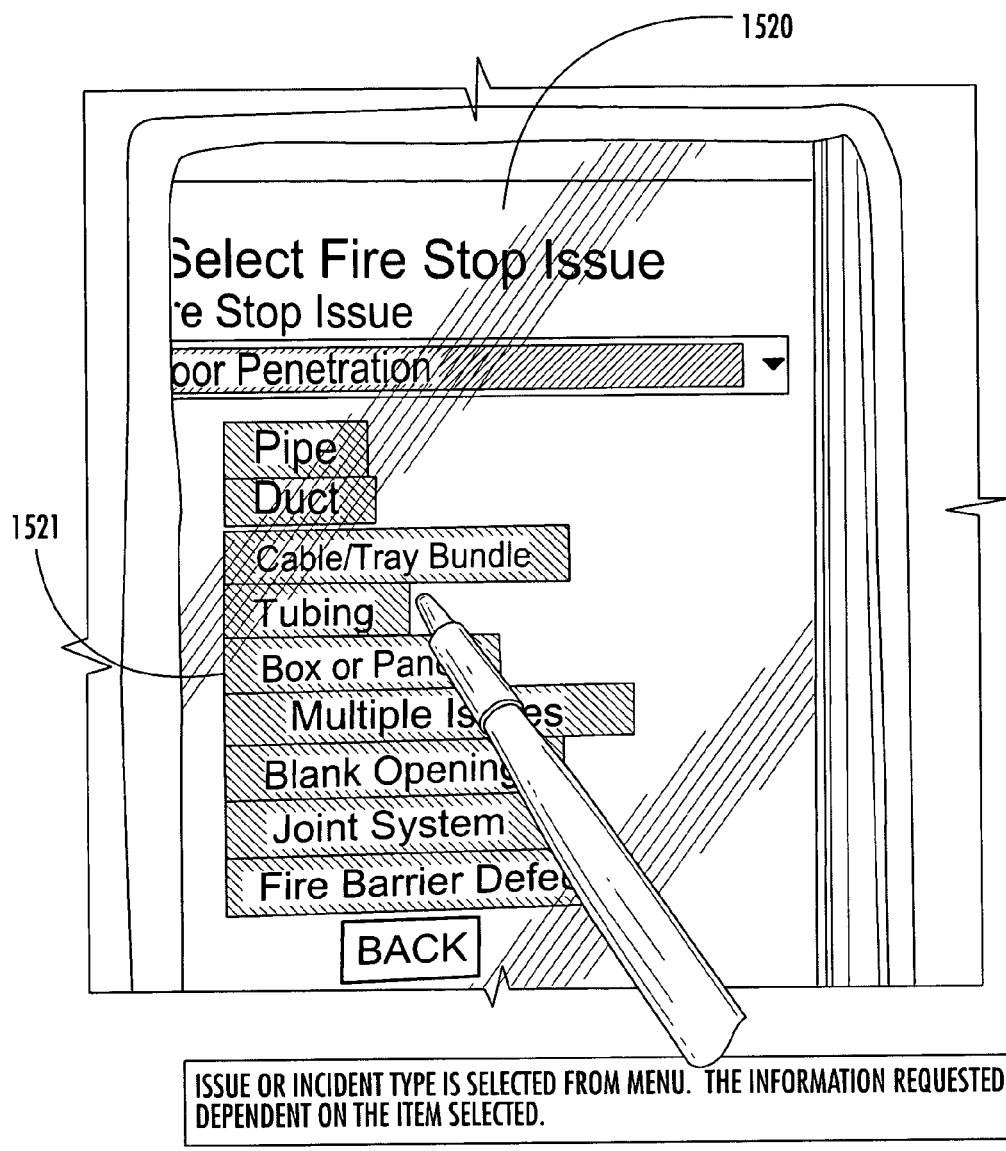
FIG. 8D is a schematic diagram of an example of an issue or incident screen for data collection template for use in fire barrier management.
Figure 8E:
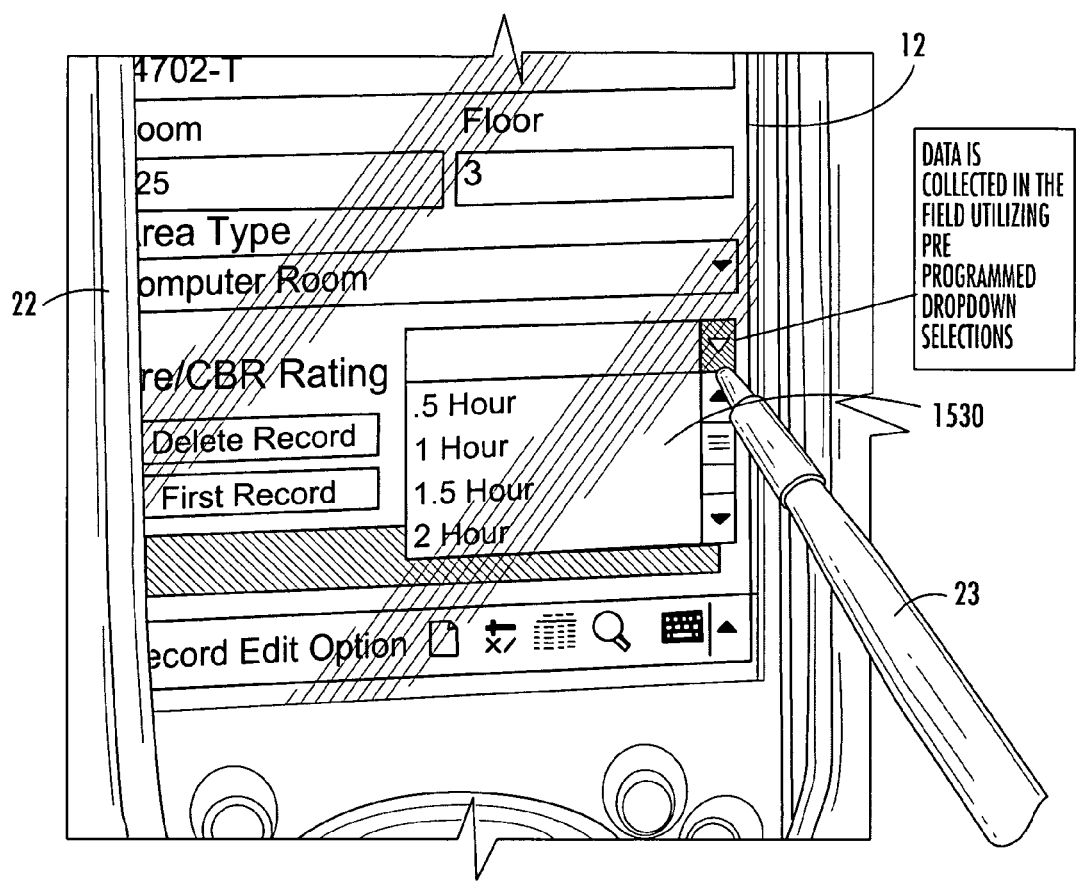
FIG. 8E is a schematic diagram of an example of submenus for collecting data in the field for data collection template for use in fire barrier management.
Figure 8F:
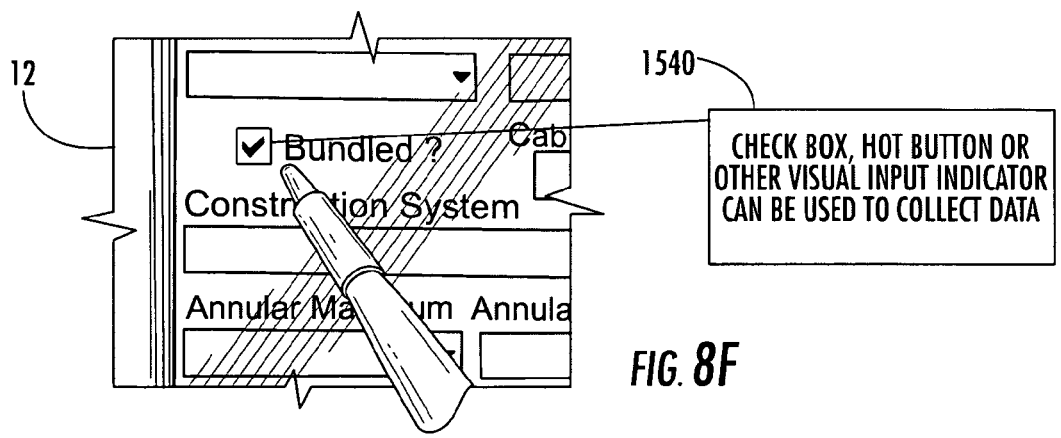
FIG. 8F is a schematic diagram of an example of a visual input indicator for data collection template for use in fire barrier management.
Figure 8G:
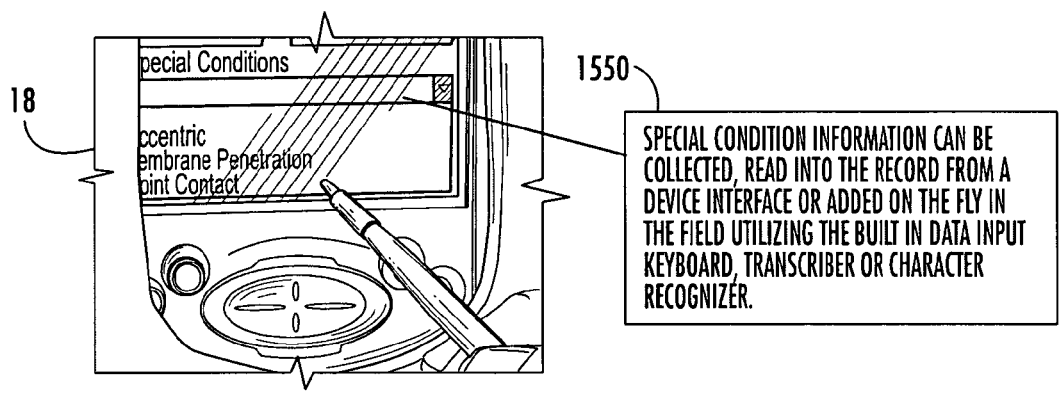
FIG. 8G is a schematic diagram of an example of a special condition entry for data collection template for use in fire barrier management.
Figure 8K:
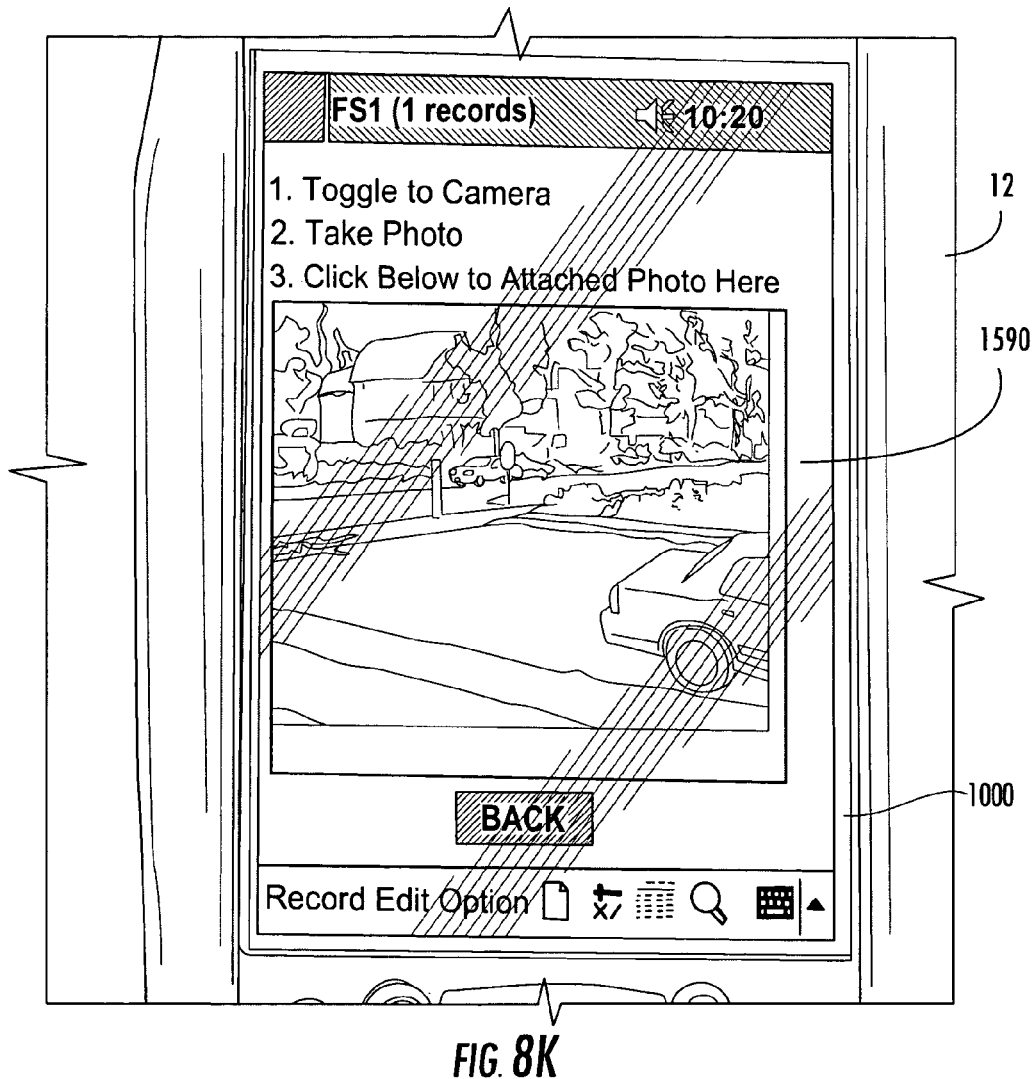
FIG. 8K is a schematic diagram of an example of a record interaction screen for data collection template for use in fire barrier management.
Figure 8L:
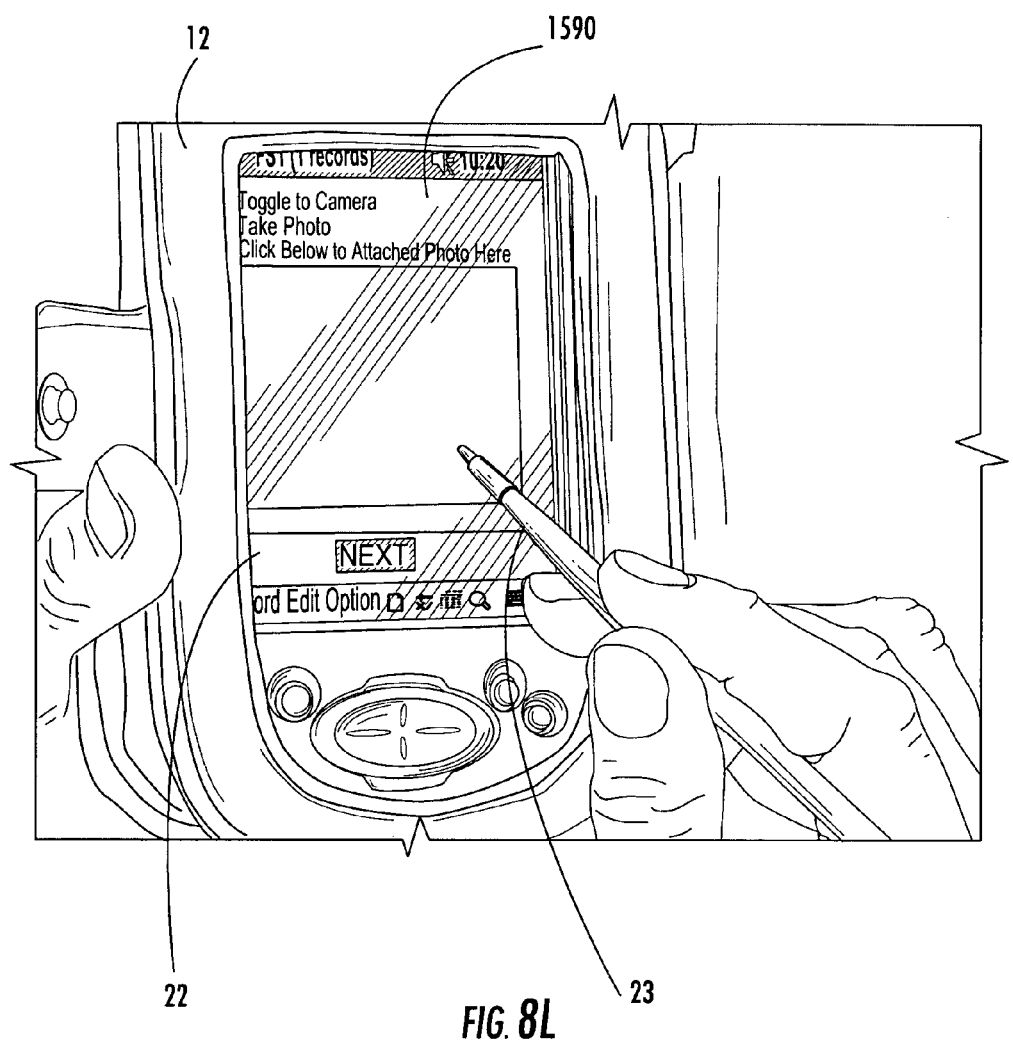
FIG. 8L is a schematic diagram of an example of a record interaction screen for data collection template for use in fire barrier management.
Figure 8M:
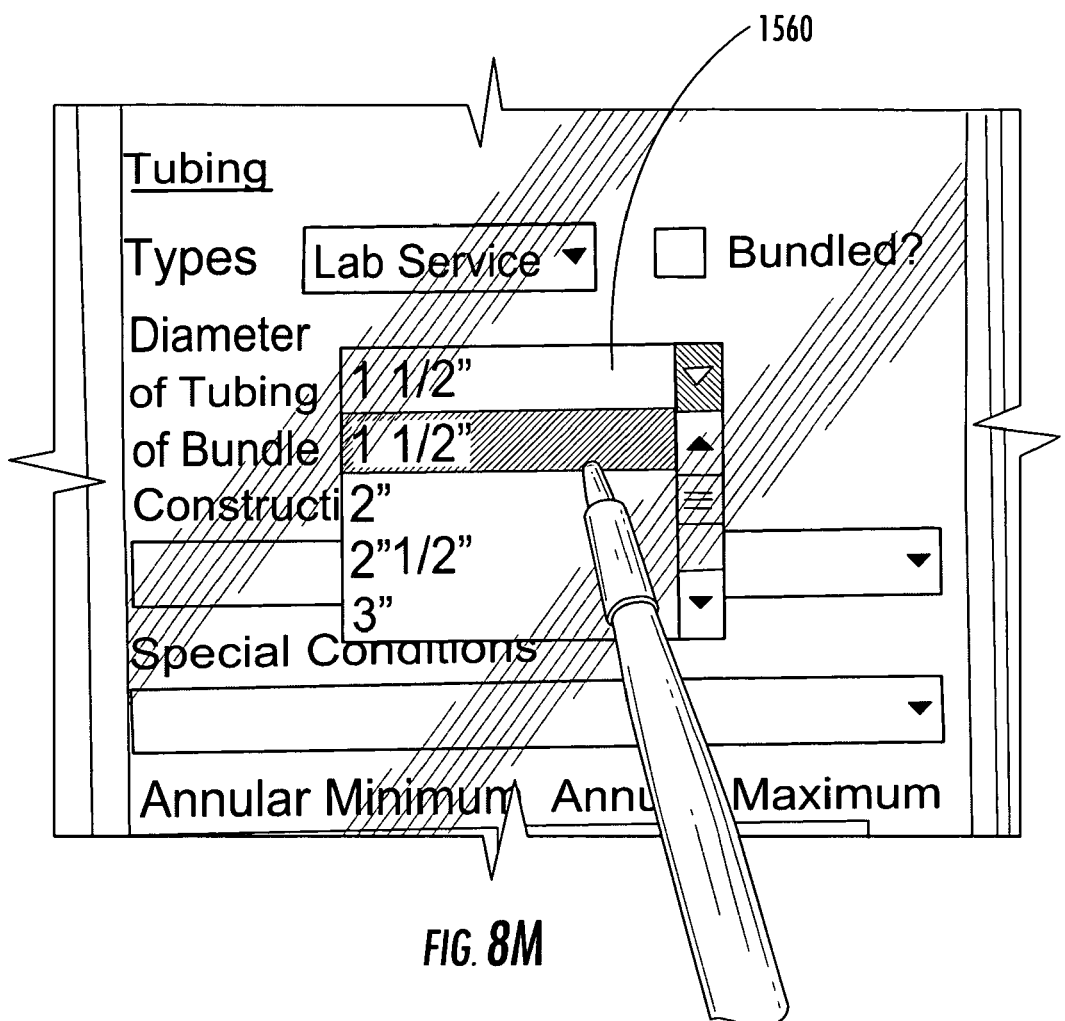
FIG. 8M is a schematic diagram of an example of additional measurement or field condition entries screen for data collection template for use in fire barrier management.
Figure 8N:
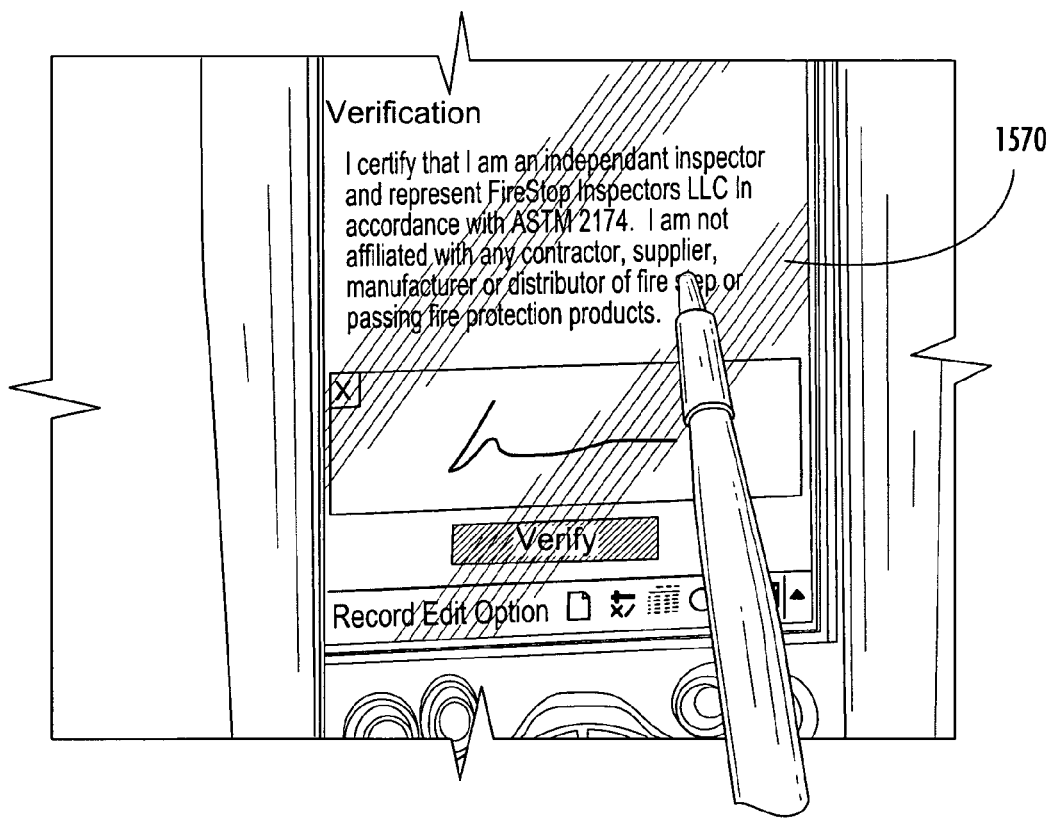
FIG. 8N is a schematic diagram of an example of a signature screen for data collection template for use in fire barrier management.
Figure 80:
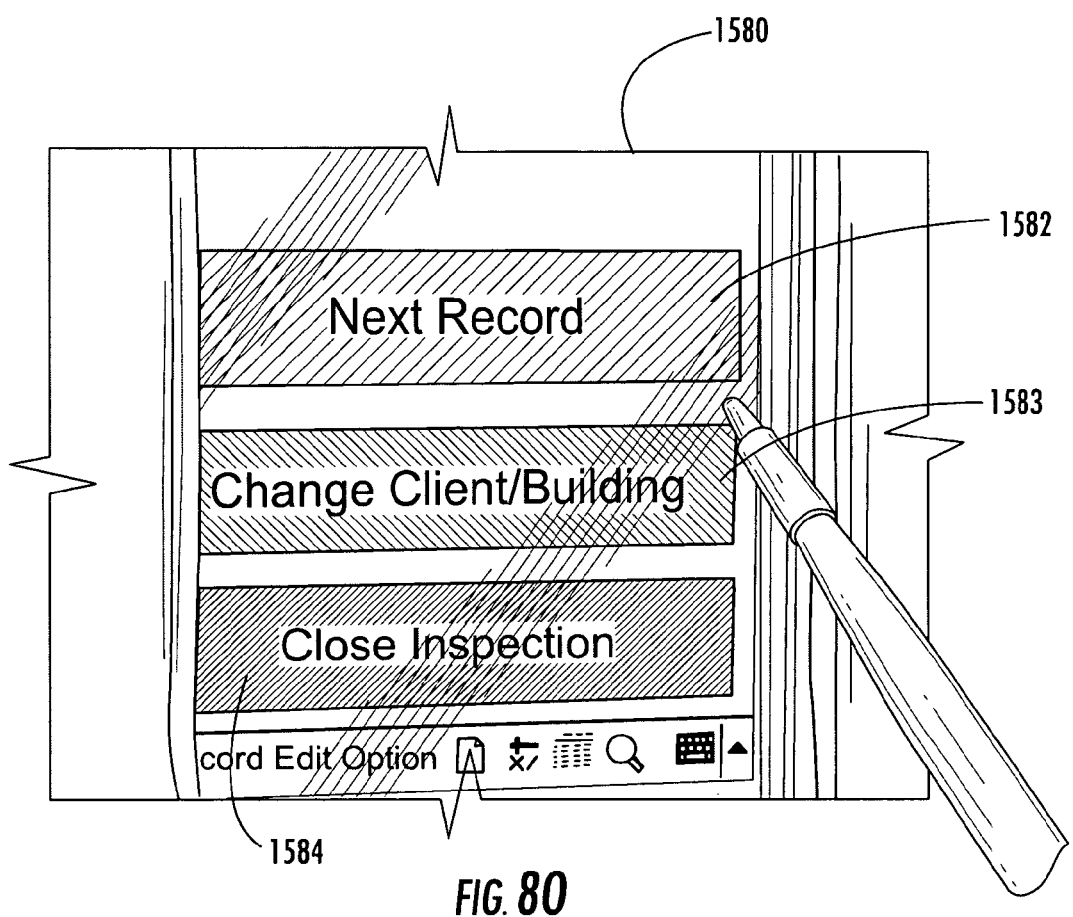
Figure 8P:
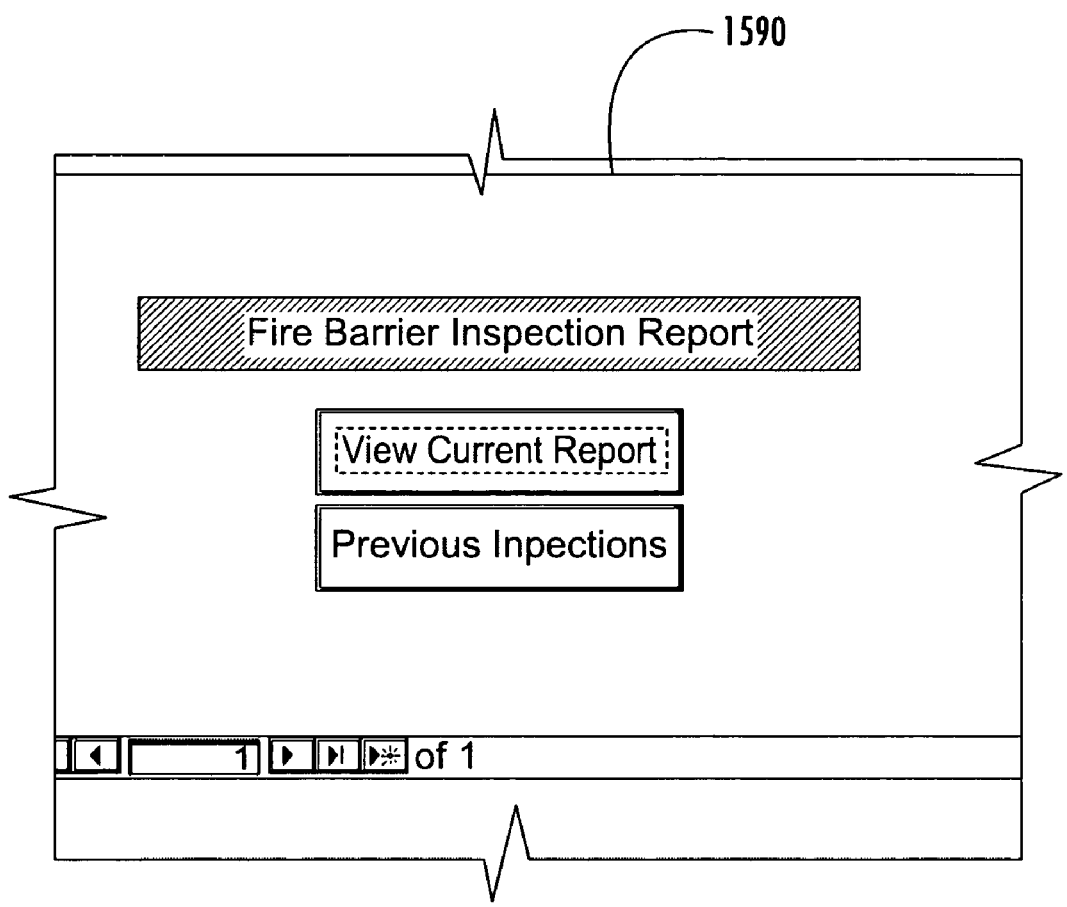
FIG. 8P is a schematic diagram of an example of a report screen for data collection template for use in fire barrier management.

FIGS. 8A-8P illustrate examples of data collection template 33 or optimized data collection template 39 for use in fire barrier management. Data collection template 33 or optimized data collection template 39 is opened on handheld device 12 with prompt 1500, to start inspection, as shown in FIG. 8A. Data collection template 33 or optimized data collection template 39 comprises client data screen 1502, which is opened on handheld device 12, as shown in FIG. 8B. Client data screen 1502 includes entries into which data can be entered. For example, entries can include project name entry 1503, client name entry 1504, inspector name entry 1505, building name entry 1506 and time date stamp entry 1508. For example, time date stamp entry 1508 can be obtained with GPS or GIS.

Data collection template 33 or optimized data collection template 39 comprises geography data screen 1510, which is opened on handheld device 12, as shown in FIG. 8C. Geography data screen 1510 can include entries, for example, such as barcode ID entry 1512, room number entry 1513, floor number entry 1514, area type entry 1515, and transducer reading entry 1516. Record prompts 1518 can be used for obtaining and deleting generated records 35.

Data collection template 33 or optimized data collection template 39 comprises issue or incident screen 1520, which is opened on handheld device 12, as shown in FIG. 8D. Issue and incident screen 1520 includes menu selections 1521 directed to an incident which can be selected. Representative example entries for menu selections 1521 include pipe, duct, cable/tray bundle, tubing, box or panel, multiple issues, blank opening, joint system and fire barrier defect.

An example data collection template 33 or optimized data collection template 39 for use in fire barrier management can include drop down submenus 1530 for collecting data in the field, as shown in FIG. 8E. Stylus 23 interacts with input screen 22 for selecting entries of submenus 1530.

An example data collection template 33 or optimized data collection template 39 for use in fire barrier management can include visual input indicator 1540, as shown in FIG. 8F. For example, visual input indicator 1540 can be a check box or hot box.

An example data collection template 33 or optimized data collection template 39 for use in fire barrier management can include special condition entry 1550, as shown in FIG. 8G.

Special condition information can be collected, for example, using a device interface keyboard, transcriber or character recognizer.

An example data collection template 33 or optimized data collection template 39 for use in fire barrier management can include measurement or field condition entries 1560, as shown in FIG. 8H. Data such as measurement or field conditions are collected by manual input or read directly into the handheld device 12 utilizing a measuring device connected directly into handheld device 12. Diagram entry 1570 opens sketch screen 1572, shown in FIG. 8I. Sketch screen 1572 allows input of a sketch directly into record 35 at time of capture.

Data collection template 33 or optimized data collection template 39 comprises photo interaction screen 1580, shown in FIG. 8J, which prompts the user to toggle to digital camera 1000 to collect of digital photo to be inspected into the record at the time of capture.

Data collection template 33 or optimized data collection template 39 comprises record interaction screen 1590, shown in FIG. 8K, which provides information to record 35. For example, a digital photograph can be captured with digital camera 1000, accepted and inserted directly into record 35. The digital photo can be inserted by tapping the photo with stylus 23, as shown in FIG. 8L.

Additional measurement of field condition entries 1560 can be collected and recorded, as shown in FIG. 8M. Data collection template 33 or optimized data collection template 39 comprises signature screen 1570, which is opened on handheld device 12 to collect and insert a digital signature into a record at the time of capture, as shown in FIG. 8N. Continue inspection screen 1580 is opened on handheld device 12 collects additional information such as entries directed to a next record entry 1562, change client building entry 1563 and close inspection entry 1564, as shown in FIG. 8O. After synchronization, an example data collection template 33 or optimized data collection template 39 for use in fire barrier management can include report screen 1590, as shown in FIG. 8P, prompting user to generate a report by a one button function.

In block 74, a fire barrier inspection report is generated from collected data 13 which is stored in record 35, as described above. An example of a fire barrier inspection report is shown in FIG. 9A. An example of a survey report is shown in FIG. 9B. In block 75, a repair order for the fire barrier is generated. For example, the repair order can be generated as a selection of manufacturer, distributor or installer and the repairs to be performed on the fire barrier. An example of a generated repair order is shown in FIG. 10.

Figure 11:
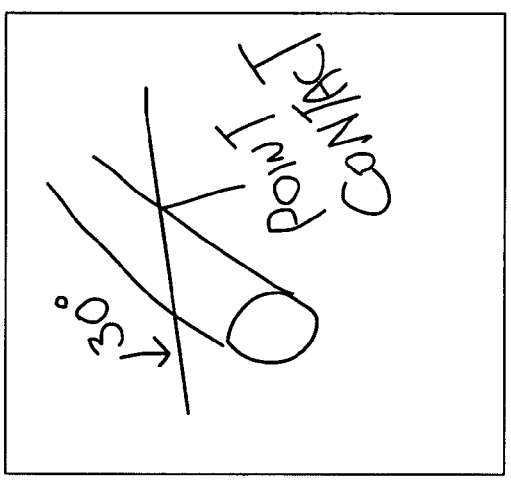
FIG. 11 is a schematic diagram of a certificate for use in fire barrier management.

In block 76, data entered into data collection template 33 or optimized data collection template 39 is optimized using optimization module 38, as described above for generating an optimized data collection template. For example, based on frequency of selections entered in data collection template 33. In block 77, a re-inspection is performed on the fire barrier using blocks 70-76 described above. In block 78, document certification is generated of the fire barrier management system. An example of a generated certificate form is shown in FIG. 11.

For example, in use of system for mobile data collection in a fire barrier inspection, the following entries of submenus can be used in data collection template 33, as shown in FIG. 9.

Field 2000 includes entries directed to an item number.

Field 2002 includes entries directed to a location. Suitable representative entries include, for example, wall, floor, shaft, and the like.

Field 2004 includes entries directed to a penetration type. Suitable representative entries include: for example, blank opening, flexible gas tube CSST, HVAC duct, joint gap, metal pipe, mixed multiple, plastic pipe, power cable, telephone cable, and the like.

Field 2006 includes entries directed to the type of barrier provided.

Field 2008 includes entries directed to a material. Suitable representative entries include, for example, ABS, cast iron, copper, polypropylene, PVC/CPVC, steel, and the like.

Field 2009 includes entries directed to a diameter.

Field 2010 includes entries directed to insulation.

Field 2012 includes entries directed to the construction system. Suitable representative entries include, for example: concrete; concrete to concrete; concrete to steel; gypsum; gypsum to concrete; gypsum to steel; wood; and the like.

Field 2014 and 2016 include entries directed to a minimum annular space and maximum annular space. Suitable representative entries include, for example, 2"; 4"; 8"; 8" and other dimensions.

Field 2018 includes entries directed to special conditions. Conditions include: closed; open; insulated; non-insulated; and the like. Other example entries which can be used in data collection template 33 for data collection in a fire barrier inspection include dimensions such as: >6"; <6"; and others. Fire rating required include: 1 hour; 2 hour; 3 hour; 4 hour and the like; other characteristics such as cable tray; outlet box; ENT; EMT; fiber optic cable and the like; UL systems number: enter here; CAJ; CBJ; FA; FC; FFD; FWD; HWD; WJ; WL; WWD; and others.

Other examples report 17 generated for a fire barrier system is shown in FIG. 10.

Examples of reports 17 generated by system for mobile data collection in a fire stop inspection application include:
1. Penetration Type
2. Materials
3. Location
4. Condition
5. Dimensions
6. Fire Rating Requirement
7. Construction System
8. Maximum Annular Space
9. Other Characteristics
10. UL Systems Number Other reports 17 can include:
Compliance Report (Inspection Data and Before/After Photographs)
Violations Report (Penetration Type by ID#)
RFQ or Charge-Back Report (Findings by Inspection Result Category)
Engineering Judgment Data Report (Inspection Results by Item Number)

Figure 12:
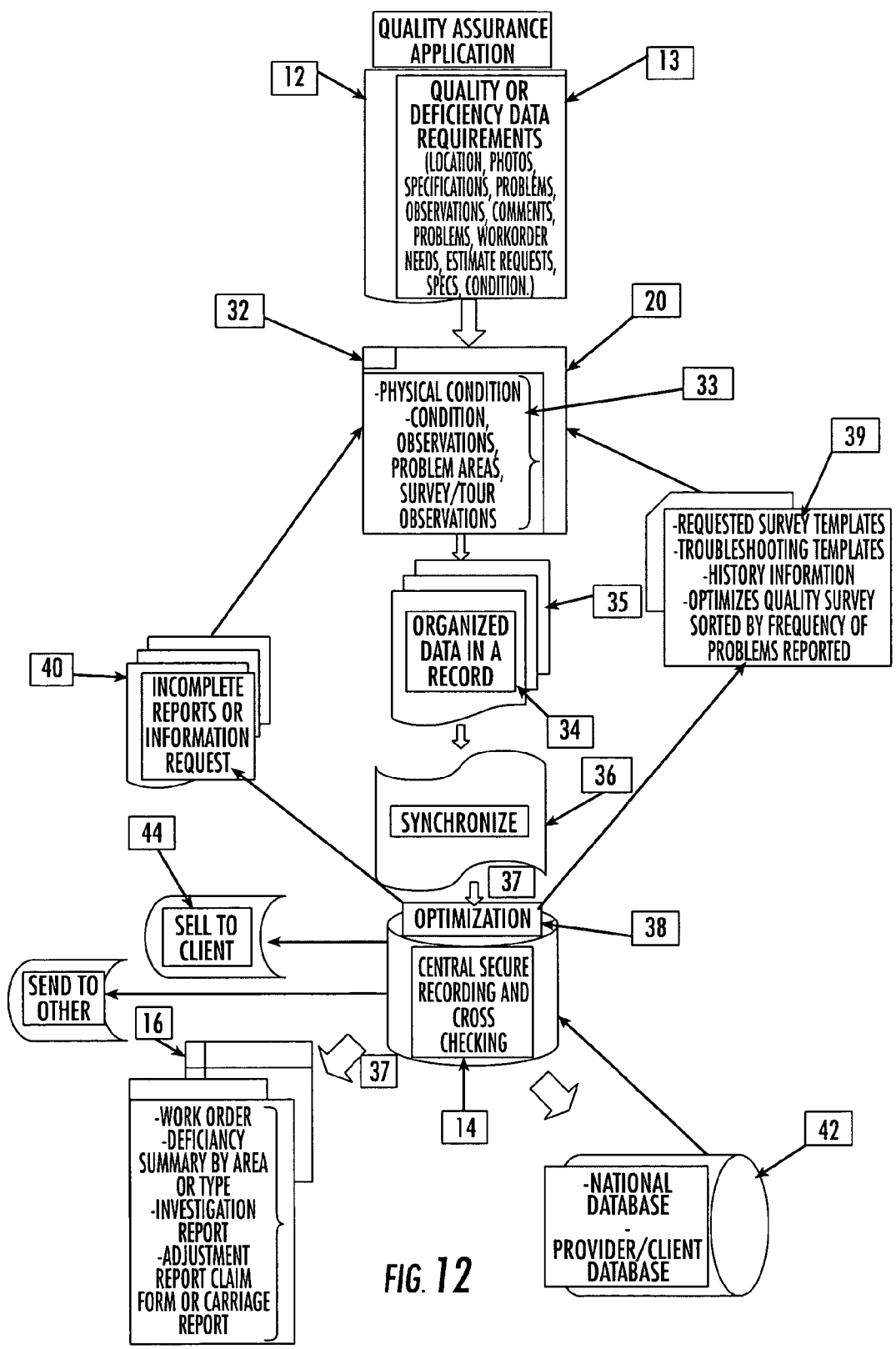
FIG. 12 is a schematic diagram of use of the system for mobile data collection in a quality assurance application.

FIG. 12 is a schematic diagram of use of the system for mobile data collection in a quality assurance application. Data 13 is collected using data collection template 33 or optimized data collection template 39. Data 13 can be related to quality or deficiency requirements such as location, photos, specifications, problems, observations, comments, work order needs, estimate requests, physical conditions, condition, observations, problem areas, and survey/tour observations. Optimized data collection template 39 can be generated as requested survey templates, troubleshooting templates, history information, optimizes quality survey sorted by frequency of problems reported. Reports 17 can be generated, which are directed, for example, to work order, deficiency, summary by area or types, investigation report, adjusters report, claim form or damage report. Reports 17 can be printed on site or at a work location to save money and eliminate report writing. Network 44 can provide a history of quality assurance data to client. Synchronized data 37 can be stored in fixed storage and processing unit 42 as a national database or provider/client database. Accordingly, collected data 13 is centralized electronically for cross checking, transfer analysis and statistical reporting, and quality of collected data is increased by providing ongoing optimized inspection and reporting.

Figure 13:
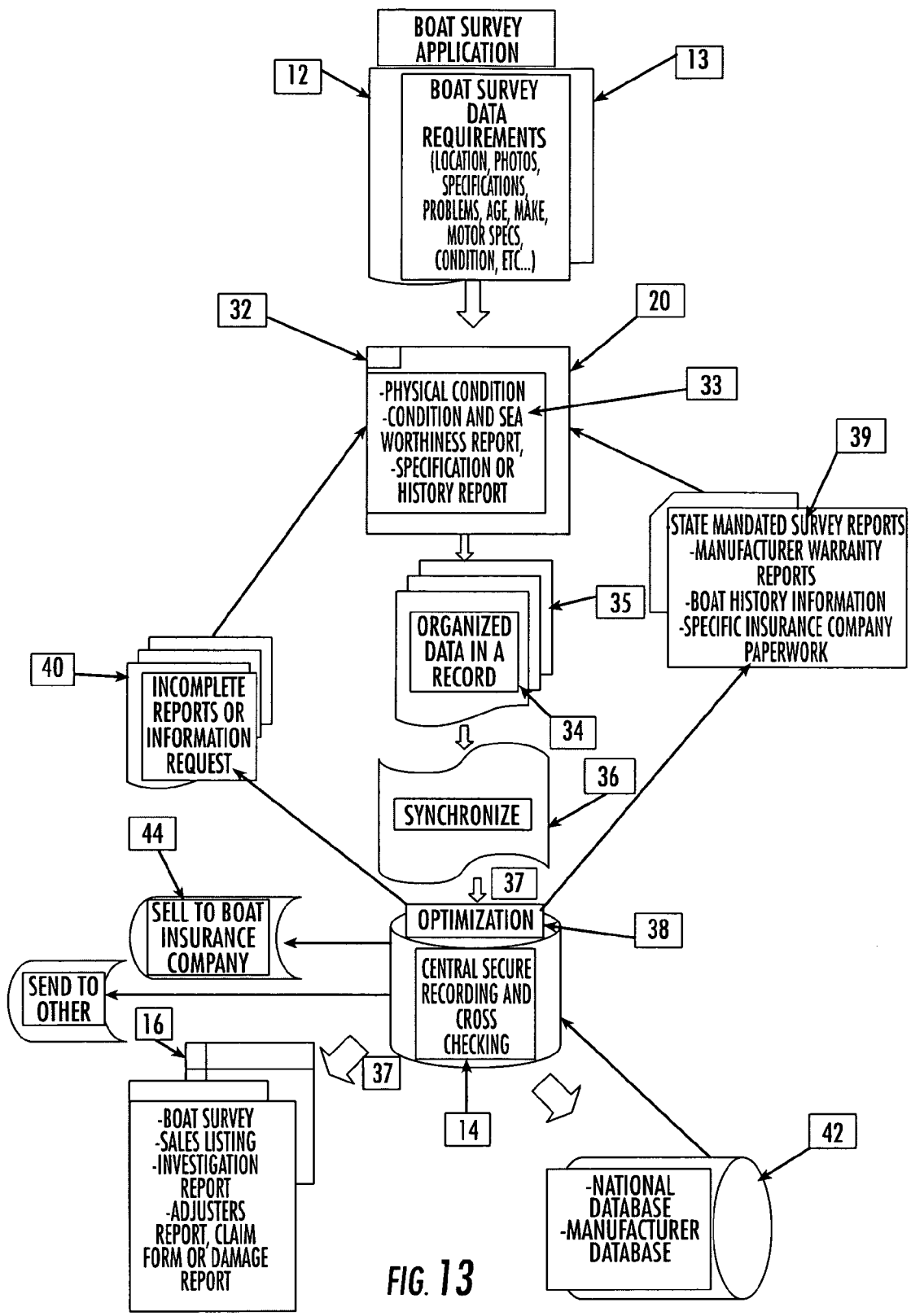
FIG. 13 is a schematic diagram of use of the system for mobile data collection in a boat survey application.

FIG. 13 is a schematic diagram of use of the system for mobile data collection in a boat survey application. Data 13 is collected using data collection template 33 or optimized data collection template 39. Data 13 can be related to boat survey data requirements, such as location, photos, specification, problems, age, make, motor specifications, condition, and the like. Optimized data collection template 39 can be generated as state mandated survey reports, manufacturer warranty reports, boat history information, insurance company paperwork, and the like. Reports 17 can be generated, for example, which are directed to boat survey, sales listing, investigation reports, adjusters' reports, claims forms, damage reports, and the like. Reports 17 can be printed on site or at a work location to save money and eliminate report writing. Network 44 can provide a history of boat owners' information for use in boat insurance. Synchronized data 37 can be stored in fixed storage and processing unit 42 as a national database or provider/client database. Accordingly, collected data 13 is centralized electronically for cross checking, transfer analysis and statistical reporting, and quality of collected data is increased by providing ongoing optimized inspection and reporting.

Figure 14:
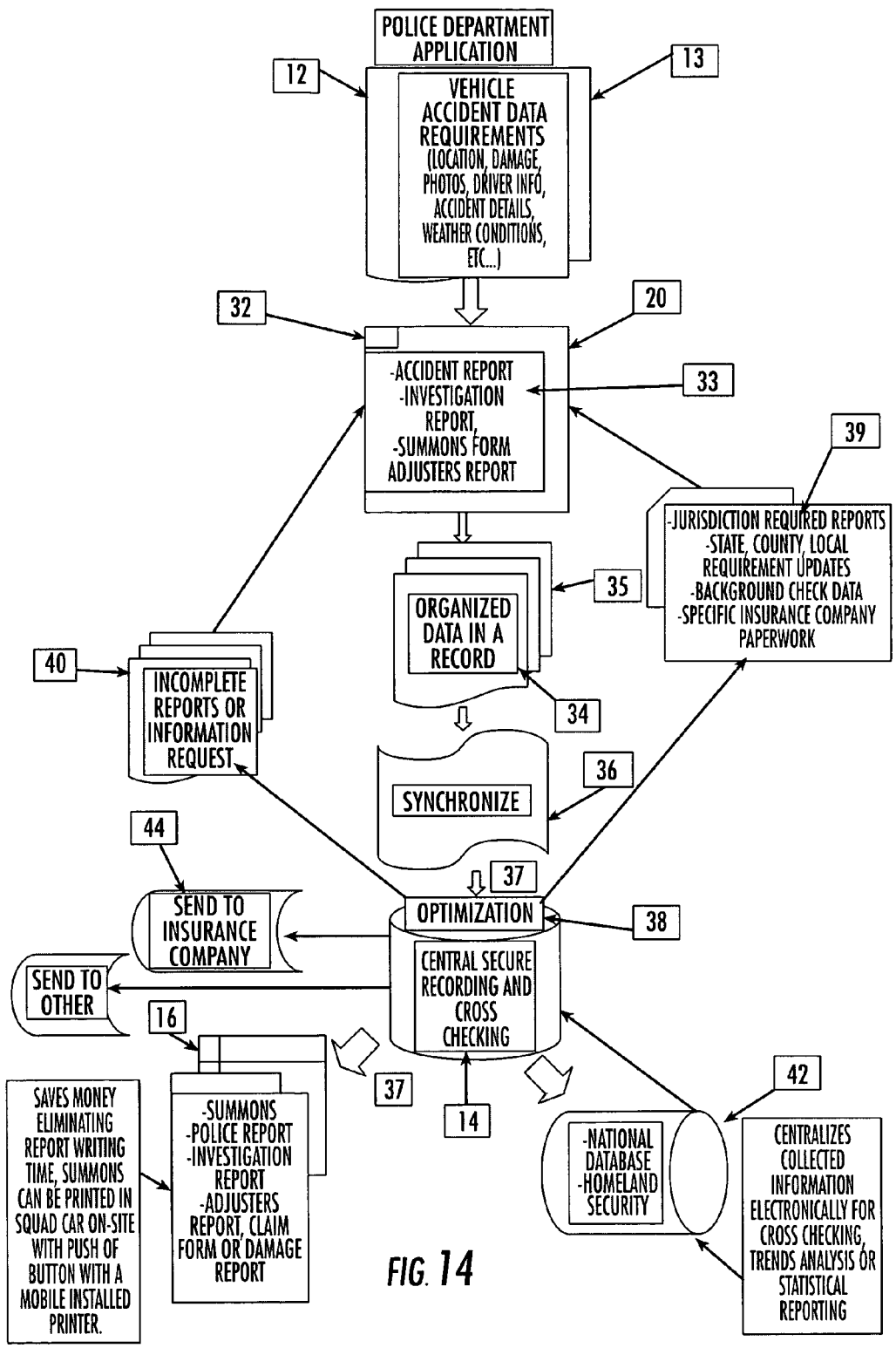
FIG. 14 is a schematic diagram of use of the system for mobile date collection in a police department application.

FIG. 14 is a schematic diagram of use of the system for mobile data collection in a police department application. Data 13 is collected using data collection template 33 or optimized data collection template 39. Data 13 can be related to vehicle accident data such as location, damage photos, driver information, accident details, weather conditions, and the like. Optimized data collection template 39 can be generated as jurisdiction required reports, state, county, local requirement updates, background check data, insurance company paperwork, and the like. Reports can be generated which are directed to summons, police reports, investigation reports, adjustors reports, claims forms, damage reports, and the like. Reports 17 can be printed on site or at a work location to save money and eliminate report writing. Network 44 can provide a history of vehicle accident data for use in auto insurance. Synchronization data 37 can be stored in a fixed storage and processing unit 42 as a national data base or provider/client database. Accordingly, collected data 13 is centralized electronically for cross checking, transfer analysis and statistical reporting, and quality of collected data is increased by providing ongoing optimized inspection and reporting.

Other examples of system for mobile data collection 10 include: revenue generation by providing a mechanism for multi-task information gathering capability in the field (e.g., a police department example filling out accident report and adjusters report at time of incident) and saving money by increasing field documentation efficiency and multi-tasking capability. Additionally, generating repair and maintenance work orders, deficiency reports, and the like, tracking of safety hazards/issues; input/tracking of maintenance job orders; preparation of RFQs for work to be performed; tracking of contractor work/job progress; tracking of fire/safety equipment and inspections; tracking of building utility inspections, such as, roofing, windows, plumbing, electrical, lighting, ceilings, floors/carpets, structures, HVAC, exterior building, sidewalks, road inspection, and the like; tracking of moving/facilities equipment, such as, forklifts, skylifts, vehicles, and overhead cranes; inventory of capital equipment; preventive maintenance of equipment; and damage/casualty records for insurance. Additional uses of system for mobile data collection 10 include: fire/building inspections, traffic control; building managers inspections; hospital administrators; contractors; inventory control clerks, insurance and claim adjusters; police investigators; OSHA, EPA, forest/park services and other government agencies; FAA, maintenance/plane inspectors; electrical transmission, gas line, sewer and water line inspection/documentation; FDA inspections and compliance; automobile repair estimating; home inspections; asset documentation; waterway/crop engineer work; other military/civil documentation; farmers, livestock, veterinarians; power/utility station inspections; oilfield inspections; ship/marine inspections; bridge/tunnel inspections; roadway inspections; damaged freight records; flood/fire/weather damage; homeland security inspection; commercial and consumer equipment repair; emergency room patient identification and triage and police suspect identification.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A method for mobile data collection comprising the steps of:
   (a) inputting one or more forms of data into one or more handheld devices, the handheld devices including a digital camera, wherein said data is inputted into said handheld device using a data collection template;
   (b) toggling between said step (a) of inputting data using a data collection template and promoting for a photograph and/or video and/or image to be taken with the one or more handheld devices for inputting digital data of said photograph and/or video and/or image into said data collection template,
   (c) organizing said inputted data from said data collection template into a record at said one or more said handheld devices at the site of the photograph and/or video and/or image; and
   (d) synchronizing data from said record for manipulating said data into one or more classifications to form synchronized data at said one or more handheld devices,
   wherein said data is inputted into said one or more handheld devices in step (a) using a data collection template and said digital data of said photograph and/or video and/or image from said digital camera is inputted into said record with said data from said data collection template at the time of capture of said photograph and/or video and/or image from said digital camera.

2. The method of claim 1 wherein said one or more forms of data are selected from the group consisting text, digital photographs, digital video, barcodes, digital sketches, digital signatures, audio, GPS, GIS, document scan, print scan, CAD/CAM scan, and interactive data retrieval from another system.

3. The method of claim 1 wherein after said step (b) further comprising the steps of:
   overlaying an electronic sketch over said photograph and/or video and/or image from said digital camera, wherein said photograph and/or video and/or image from said digital camera and said overlaid electronic sketch is inputted into said record with said photograph and/or video and/or image from said data collection template at the time of capture of photograph and/or video and/or image from said digital camera.

4. The method of claim 1 wherein after step (d) further comprising the steps of:
(e) optimizing said synchronized data based on a predetermined criteria; and
(f) generating an optimized data collection template; and repeating steps (a) through (d) wherein said data is inputted into said handheld device in step (a) using said optimized data collection template.

5. The method of claim 4 wherein said predetermined criteria is a frequency of use of said data inputted into said handheld device.

6. The method of claim 4 wherein said predetermined criteria is a desired information request.

7. The method of claim 4 wherein said predetermined criteria is a statistical program.

8. The method of claim 4 wherein said step (e) optimizing said synchronized data further comprises the step of:
adding answers inputted in said data collection template to said optimized data collection template.

9. The method of claim 4 wherein said optimized data collection template comprises:
a user interface comprising one or more prompts for gathering said data using said handheld device, said prompts being visual, sound, code, or vibration.

10. The method of claim 1 wherein said data collection template comprises:
a user interface comprising one or more prompts for gathering said data using said handheld device, said prompts being visual, sound, code, or vibration.

11. The method of claim 1 wherein said data collection template is an electronic form comprising one or more menus or submenus.

12. The method of claim 11 wherein said optimized data collection template is an electronic form comprising one or more submenus which are a re-order of entries of said one or more menus or submenus of said data collection template.

13. The method of claim 1 wherein after said step (c) of synchronized data further comprising the step of:
forwarding said record to a central processing system and said step (e) is performed at said central processing system.

14. The method of claim 1 further comprising the step of:
storing said synchronized data.

15. The method of claim 1 further comprising the step of:
generating a report from said synchronized data.

16. The method of claim 15 further comprising the step of:
printing said report at a site of said handheld device where the photograph and/or video and/or image is taken.

17. The method of claim 15 wherein said report is a standard or custom report.

18. The method of claim 1 wherein before step (a) further comprises the step of:
forwarding a previously generated record to said handheld device.

19. The method of claim 1 wherein said step (e) of synchronizing data step comprises the steps of:
manipulating said data in said record into a synchronization table; and
filtering said data in said synchronization table to one or more relationship tables.

20. The method of claim 19 further comprising the steps of:
combining said one or more relationship tables based on a predetermined criteria for generating an optimized data collection template and repeating steps (a) through (e) wherein subsequent data is inputted into said handheld device using said optimized data collection template.

21. The method of claim 1 wherein a plurality of handheld devices are used for imputing said data.

22. A method for mobile data collection in inspection of a fire barrier comprising the steps of:
(a) inputting one or more forms of data of an inspection of said fire barrier into one or more handheld devices, the handheld devices including a digital camera, using data collection templates;
(b) toggling between said step (a) of inputting data using a data collection template and promoting for a digital photograph and/or video and/or image to be taken with the one or more handheld devices for inputting digital data of said photograph and/or video and/or image into said data collection template,
(c) organizing said inputted data from said data collection template into a record at said one or more said handheld devices at the site of the photograph and/or video and/or image; and
(d) synchronizing data from said record for manipulating said data into one or more classifications to form synchronized data at said one or more handheld devices,
wherein said digital data is inputted into said record with said data from said data collection template at the time of capture of said photograph and/or video and/or image from said digital camera.

23. The method of claim 22 wherein said one or more forms of data are selected from the group consisting text, digital photographs, digital video, barcodes, digital sketches, digital signatures, audio, GPS, GIS, document scan, print scan, CAD/CAM scan, and interactive data retrieval from another system.

24. The method of claim 22 wherein said data is in the form of a barcode attached to said fire barrier.

25. The method of claim 22 wherein after said step (b) further comprising the steps of:
overlaying an electronic sketch over said photograph and/or video and/or image from said digital camera,
wherein said photograph and/or video and/or image from said digital camera and said overlaid electronic sketch is inputted into said record with said data from said data collection template at the time of capture of photograph and/or video and/or image from said digital camera.

26. The method of claim 22 wherein after step (d) further comprising the steps of:
(e) optimizing said synchronized data based on a predetermined criteria; and
(f) generating an optimized data collection template; and repeating steps (a) through (d) wherein said data is inputted into said handheld device in step (a) using said optimized data collection template.

27. The method of claim 26 wherein said optimized data collection template is an electronic form comprising one or more submenus which are a re-order of entries of said one or more menus or submenus of said data collection template.

28. The method of claim 22 wherein said step (e) optimizing said synchronized data further comprises the step of:
adding answers inputted in said data collection template to said optimized data collection template.

29. The method of claim 22 wherein said data collection template is an electronic form comprising one or more menus or submenus.

30. The method of claim 22 wherein a repair order is generated from said synchronized data.

31. The method of claim 30 further comprising the step of: re-inspecting said fire barrier after a repair of said fire barrier is performed from said repair order.

32. The method of claim 30 further comprising the step of: storing said synchronized data.

33. The method of claim 30 further comprising the steps of:
combining said one or more relationship tables based on a predetermined criteria for generating an optimized data collection template and repeating steps (a) through (d) wherein subsequent data is inputted into said handheld device using said optimized data collection template.

34. The method of claim 22 wherein a report of said fire barrier is generated from said synchronized data.

35. A method for mobile data collection in a quality assurance application comprising the steps of:
(a) inputting one or more forms of data of quality assurance into one or more handheld devices, the handheld devices including a digital camera, using data collection templates;
(b) toggling between said step (a) of inputting data using a data collection template and prompting for a digital photograph and/or video and/or image to be taken with the one or more handheld devices for inputting digital data of said photograph and/or video and/or image into said data collection template,
(c) organizing said inputted data from said data collection template into a record at said one or more said handheld devices at the site of the photograph and/or video and/or image; and
(d) synchronizing data from said record for manipulating said data into one or more classifications to form synchronized data at said one or more handheld devices,
wherein said digital data is inputted into said record with said data from said data collection template at the time of capture of said photograph and/or video and/or image from said digital camera.

36. The method of claim 35 wherein said one or more forms of data are selected from the group consisting text, digital photographs, digital video, barcodes, digital sketches, digital signatures, audio, GPS, GIS, document scan, print scan, CAD/CAM scan, and interactive data retrieval from another system.

37. The method of claim 35 wherein after said step (b) further comprising the steps of:
overlaying an electronic sketch over said digital data,
wherein said digital data and said overlaid electronic sketch is inputted into said record with said data from said data collection template at the time of capture of said digital data.

38. The method of claim 35 wherein after step (c) further comprising the steps of:
(e) optimizing said synchronized data based on a predetermined criteria; and
(f) generating an optimized data collection template; and repeating steps (a) through (c) wherein said data is inputted into said handheld device in step (a) using said optimized data collection template.

39. The method of claim 35 further comprising the step of: storing said synchronized data.

40. The method of claim 35 further comprising the step of: generating a report of quality assurance from said synchronized data.

41. A method for mobile data collection in a boat survey application comprising the steps of:
(a) inputting one or more forms of data of a boat survey into one or more handheld devices, the handheld devices including a digital camera, using data collection templates;
(b) toggling between said step (a) of inputting data using a data collection template and prompting for a digital photograph and/or video and/or image to be taken with the one or more handheld devices for inputting digital data of said photograph and/or video and/or image into said data collection template,
(c) organizing said inputted data from said data collection template into a record at said one or more said handheld devices at the site of the photograph and/or video and/or image; and
(d) synchronizing data from said record for manipulating said data into one or more classifications to form synchronized data on said one or more handheld devices,
wherein said digital data is inputted into said record with said data from said data collection template at the time of capture of said photograph and/or video and/or image from said digital camera.

42. The method of claim 41 wherein said one or more forms of data are selected from the group consisting text, digital photographs, digital video, barcodes, digital sketches, digital signatures, audio, GPS, GIS, document scan, print scan, CAD/CAM scan, and interactive data retrieval from another system.

43. The method of claim 41 wherein after said step (b) further comprising the steps of:
overlaying an electronic sketch over said digital data,
wherein said digital and said overlaid electronic sketch is inputted into said record with said data from said data collection template at the time of capture of said digital data.

44. The method of claim 41 wherein after step (d) further comprising the steps of:
(d) optimizing said synchronized data based on a predetermined criteria; and
(e) generating an optimized data collection template; and repeating steps (a) through (d) wherein said data is inputted into said handheld device in step (a) using said optimized data collection template.

45. The method of claim 41 further comprising the step of: storing said synchronized data.

46. The method of claim 41 further comprising the step of: generating a report from said synchronized data.

47. A method for data collection in a police department application comprising the steps of:
(a) inputting one or more forms of data of a police department application into one or more handheld devices, the handheld devices including a digital camera, using data collection templates;
(b) toggling between said step (a) of inputting data using a data collection template and prompting for a digital photograph and/or video and/or image to be taken with the one or more handheld devices for inputting digital data of said photograph and/or video and/or image into said data collection template, (c) organizing said inputted data from said data collection template into a record at said one or more said handheld devices at the site of the photograph and/or video and/or image; and (d) synchronizing data from said record for manipulating said data into one or more classifications to form synchronized data on said one or more handheld devices, wherein said digital data is inputted into said record with said data from said data collection template at the time of capture of said photograph and/or video and/or image from said digital camera.

48. The method of claim 47 wherein said one or more forms of data are selected from the group consisting text, digital photographs, digital video, barcodes, digital sketches, digital signatures, audio, GPS, GIS, document scan, print scan, CAD/CAM scan, and interactive data retrieval from another system.

49. The method of claim 47 wherein after said step (b) of further comprising the steps of:

overlaying an electronic sketch over said digital data, wherein said digital data and said overlaid electronic sketch is inputted into said record with said data from said data collection template at the time of capture of said digital data.

50. The method of claim 47 wherein after step (d) further comprising the steps of:

(e) optimizing said synchronized data based on a predetermined criteria; and (f) generating an optimized data collection template; and repeating steps (a) through (d) wherein said data is inputted into said handheld device in step (a) using said optimized data collection template.

51. The method of claim 47 further comprising the step of: storing said synchronized data.

52. The method of claim 47 further comprising the step of: generating a report of a police department application from said synchronized data.

* * * * *